(12) United States Patent
Isaac et al.

(10) Patent No.: US 10,143,131 B2
(45) Date of Patent: Dec. 4, 2018

(54) METHOD AND APPARATUS TO CONTROL RESIDUE WIDTH

(71) Applicant: CNH Industrial America LLC, New Holland, PA (US)

(72) Inventors: Nathan E. Isaac, Lancaster, PA (US); Kevin Frederick Knapp, Magnolia, IL (US); Austin L. Jackson, East Earl, PA (US); William Mark McCully, Lancaster, PA (US); Clayton E. Banks, Jr., Brownstown, PA (US)

(73) Assignee: CNH Industrial America LLC, New Holland, PA (US)

( * ) Notice: Subject to any disclaimer, the term of this patent is extended or adjusted under 35 U.S.C. 154(b) by 449 days.

(21) Appl. No.: 14/309,464

(22) Filed: Jun. 19, 2014

(65) Prior Publication Data

US 2014/0302897 A1    Oct. 9, 2014

Related U.S. Application Data

(63) Continuation-in-part of application No. 13/275,508, filed on Oct. 18, 2011, now abandoned.

(51) Int. Cl.
*A01D 41/127* (2006.01)
*A01D 41/12* (2006.01)

(52) U.S. Cl.
CPC ....... *A01D 41/127* (2013.01); *A01D 41/1243* (2013.01)

(58) Field of Classification Search
CPC .... A01D 41/124; A01D 41/1243; A01F 12/00

USPC ................................................. 460/111, 112
See application file for complete search history.

(56) References Cited

U.S. PATENT DOCUMENTS

| | | | |
|---|---|---|---|
| 3,561,200 A * | 2/1971 | Minunno | A01D 34/02 56/14.7 |
| 5,569,081 A | 10/1996 | Baumgarten et al. | |
| 5,797,793 A | 8/1998 | Matousek et al. | |
| 6,406,368 B1 | 6/2002 | Cruson et al. | |
| 6,424,295 B1 | 7/2002 | Lange | |
| 6,729,953 B2 | 5/2004 | Bueermann | |
| 6,783,454 B2 | 8/2004 | Bueermann | |
| 6,840,853 B2 | 1/2005 | Foth | |
| 6,976,913 B2 | 12/2005 | DuQuesne et al. | |
| 7,086,942 B2 | 8/2006 | Niermann et al. | |
| 7,223,168 B2 | 5/2007 | Anderson et al. | |
| 7,261,633 B2 | 8/2007 | Benes | |

(Continued)

*Primary Examiner* — John Weiss
(74) *Attorney, Agent, or Firm* — Patrick M. Sheldrake

(57) ABSTRACT

A system for discharging residue from an agricultural combine to a ground surface. The system including a spreader operatively connected to a rear end of the agricultural combine. The spreader having one or more impellers each having an axis of rotation and a housing. The impellers are operatively connected to the housing for rotating therein. The housing has an inlet for receiving a flow of residue, an outlet configured about a lateral side of the housing for discharging the flow of residue, and one or more residue flow distributors each pivotably movable in a direction generally parallel with the axis of rotation. Each flow distributor is configured to guide the discharged flow of residue sidewardly away from the spreader to the ground surface. The rotation of the one or more impellers discharge a flow of residue received through the inlet out through the outlet.

20 Claims, 22 Drawing Sheets

(56) References Cited

U.S. PATENT DOCUMENTS

| | | |
|---|---|---|
| 7,281,973 B2 | 10/2007 | Anderson et al. |
| 7,281,974 B2 | 10/2007 | Anderson et al. |
| 7,306,174 B2 | 12/2007 | Pearson et al. |
| 7,390,253 B2 | 6/2008 | Farley et al. |
| 7,467,997 B2 | 12/2008 | Niermann et al. |
| 7,487,024 B2 | 2/2009 | Farley et al. |
| 7,553,227 B2 | 6/2009 | Landuyt |
| 7,640,092 B2 | 12/2009 | Dammann |
| 8,010,262 B2 | 8/2011 | Schroeder et al. |
| 8,118,650 B2 | 2/2012 | Isaac et al. |
| 2008/0268927 A1 | 10/2008 | Farley et al. |
| 2009/0099737 A1 | 4/2009 | Wendte et al. |
| 2009/0287380 A1 | 11/2009 | Chervenka et al. |
| 2010/0299030 A1 | 11/2010 | Mitchell |
| 2011/0130181 A1 | 6/2011 | Roberge et al. |
| 2011/0237316 A1 | 9/2011 | Isaac et al. |
| 2013/0095899 A1 | 4/2013 | Knapp |
| 2014/0031096 A1 | 1/2014 | Nathan et al. |

\* cited by examiner

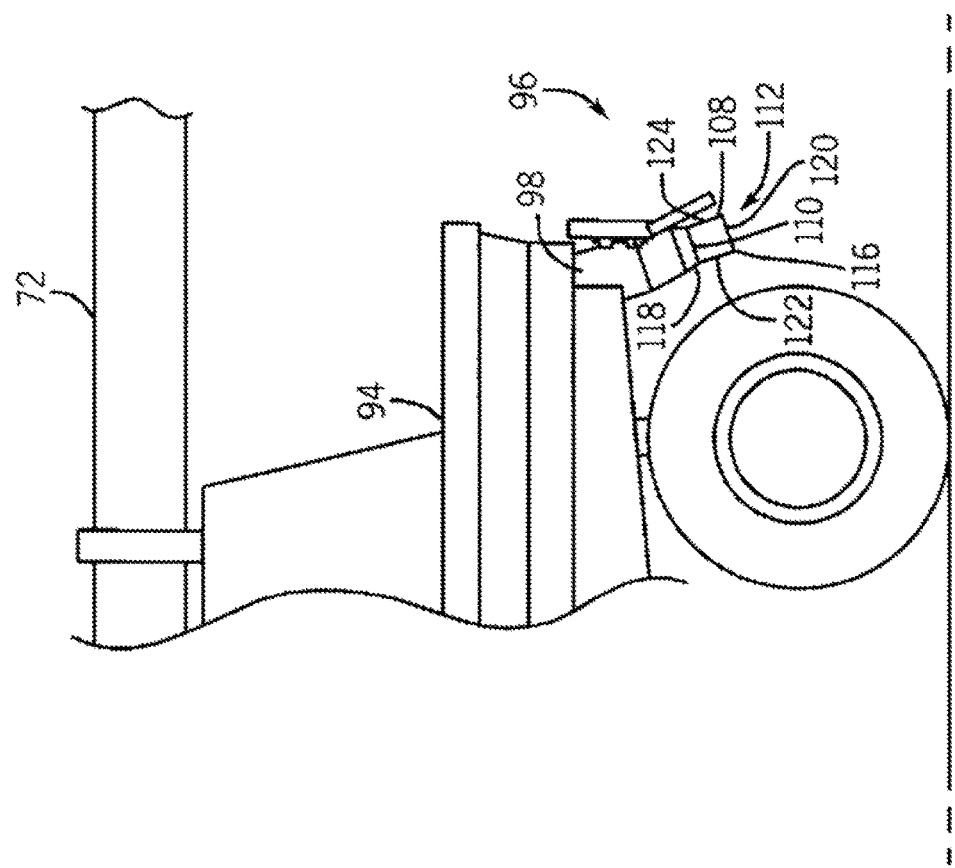

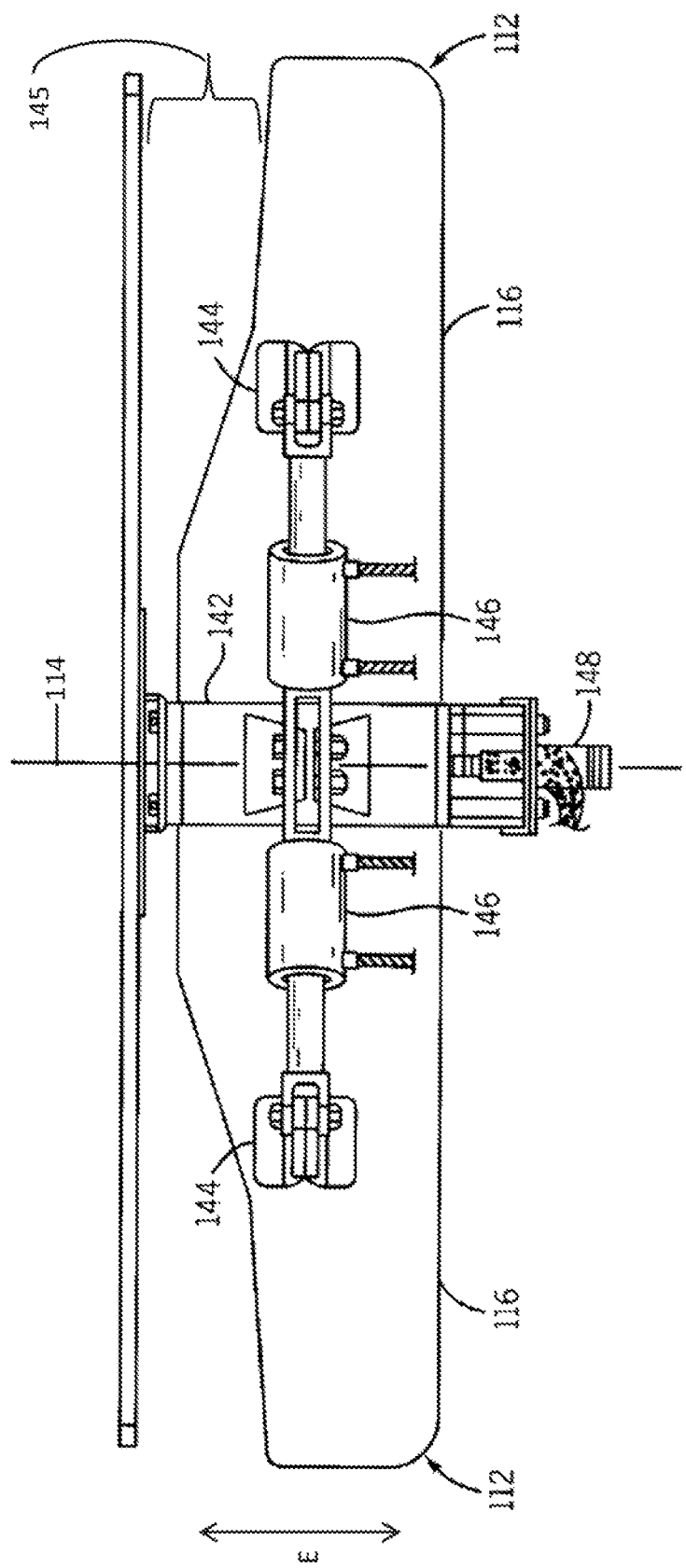

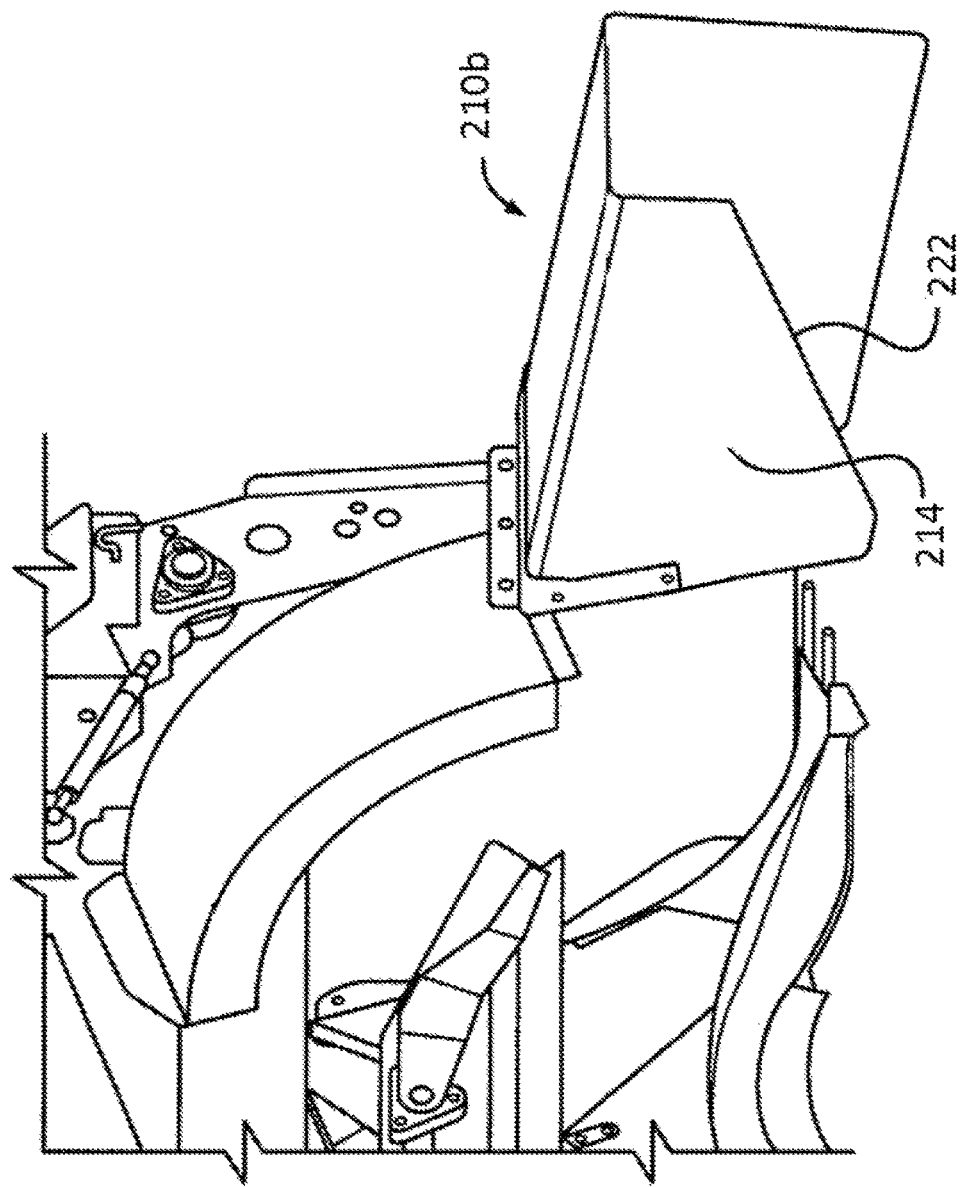

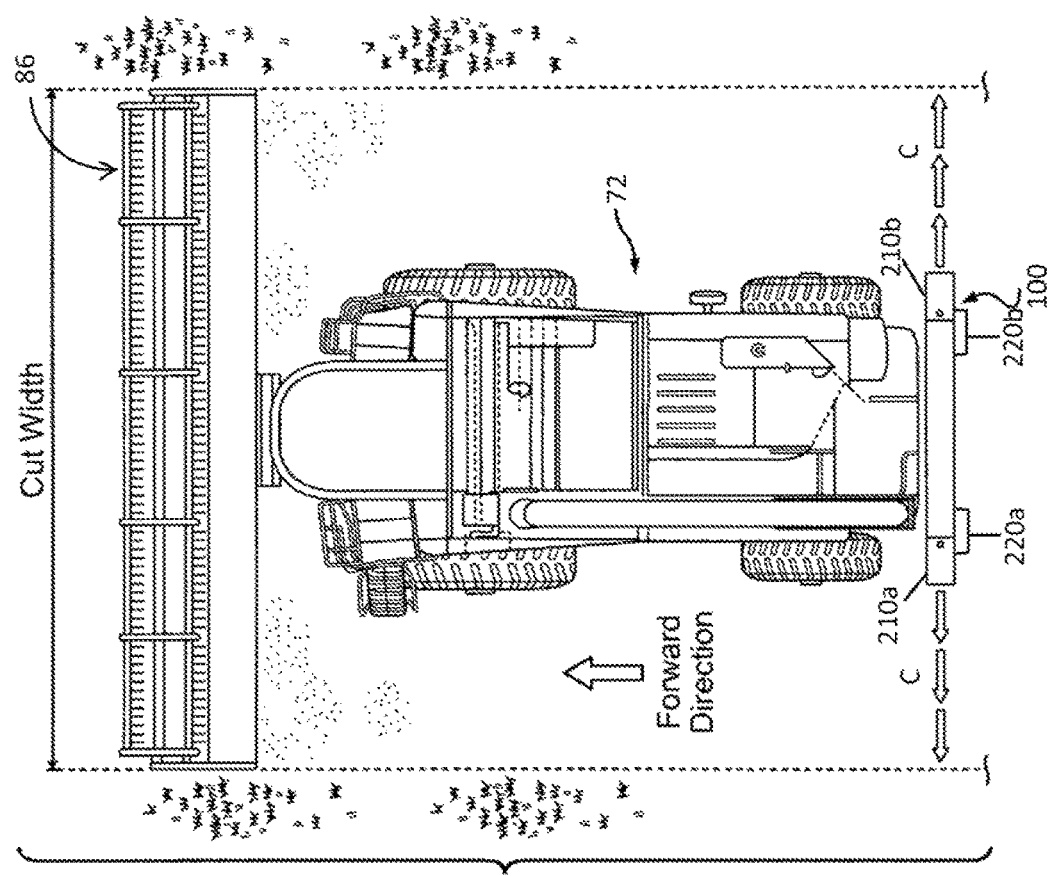

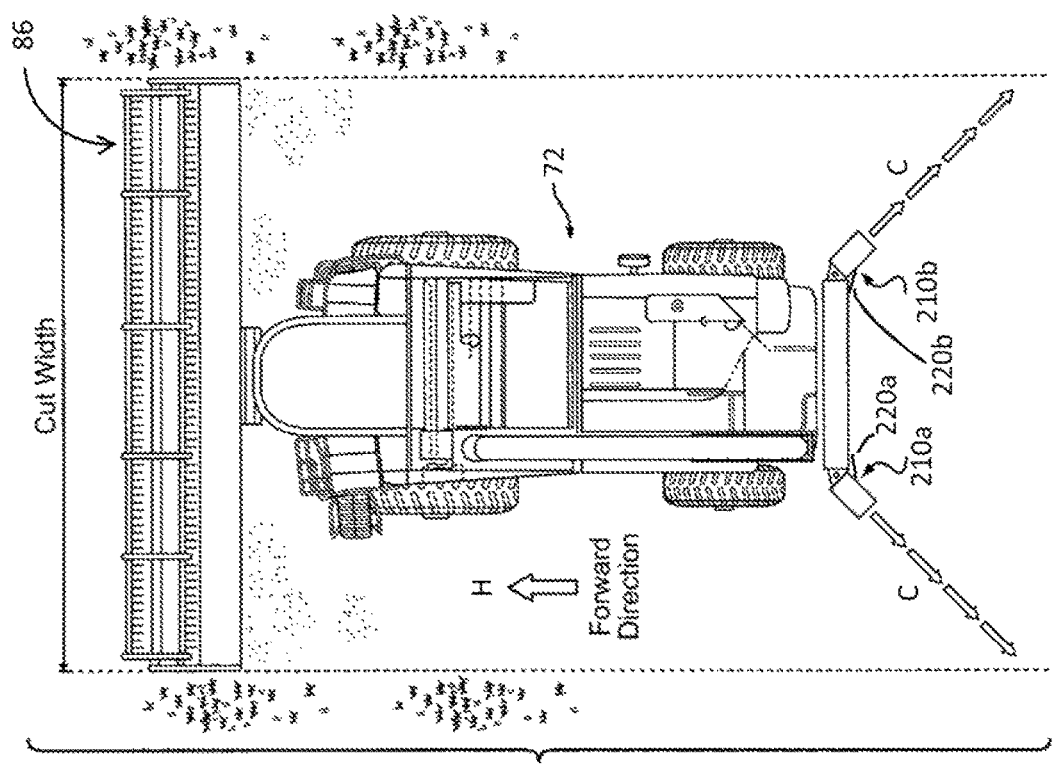

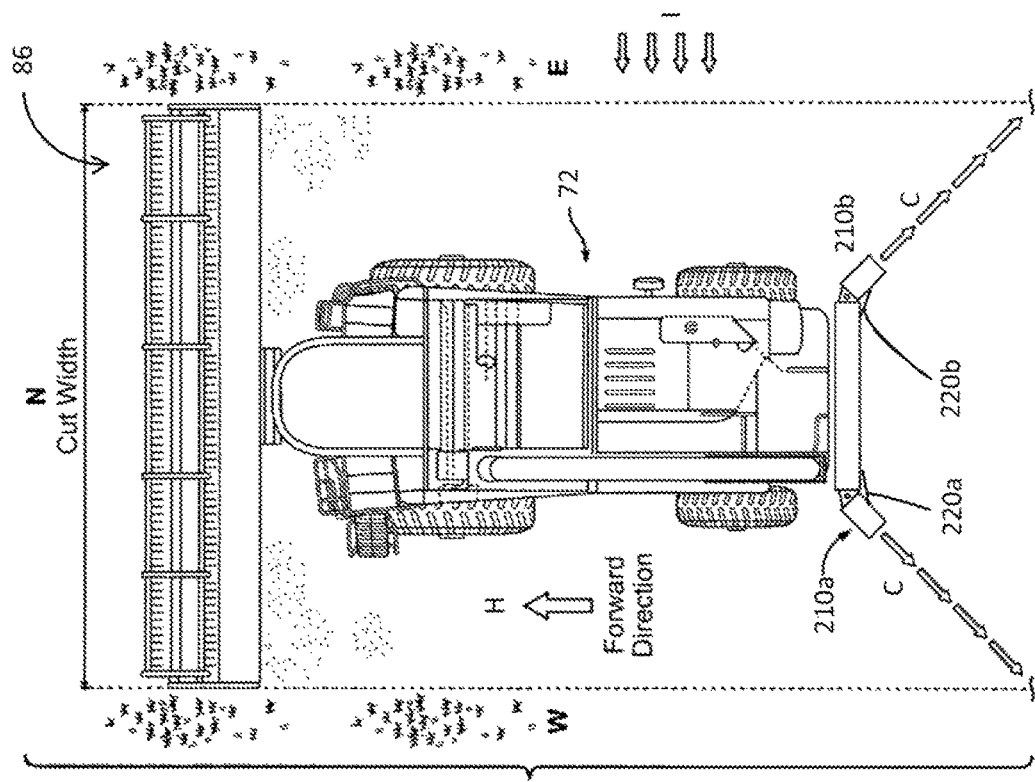

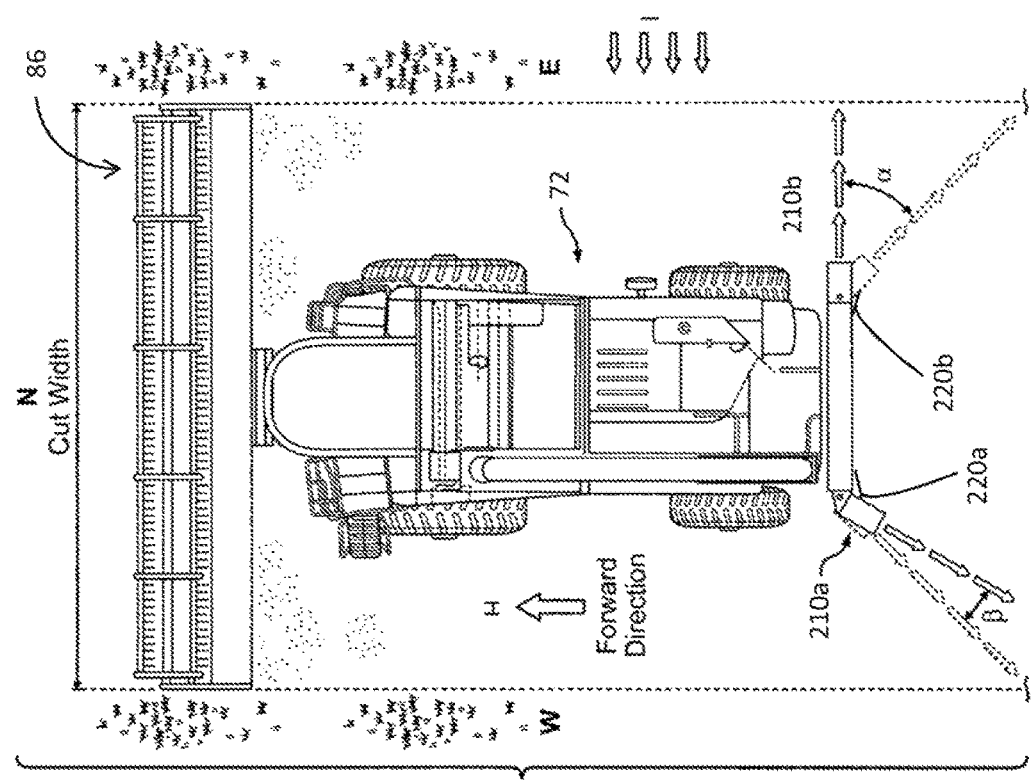

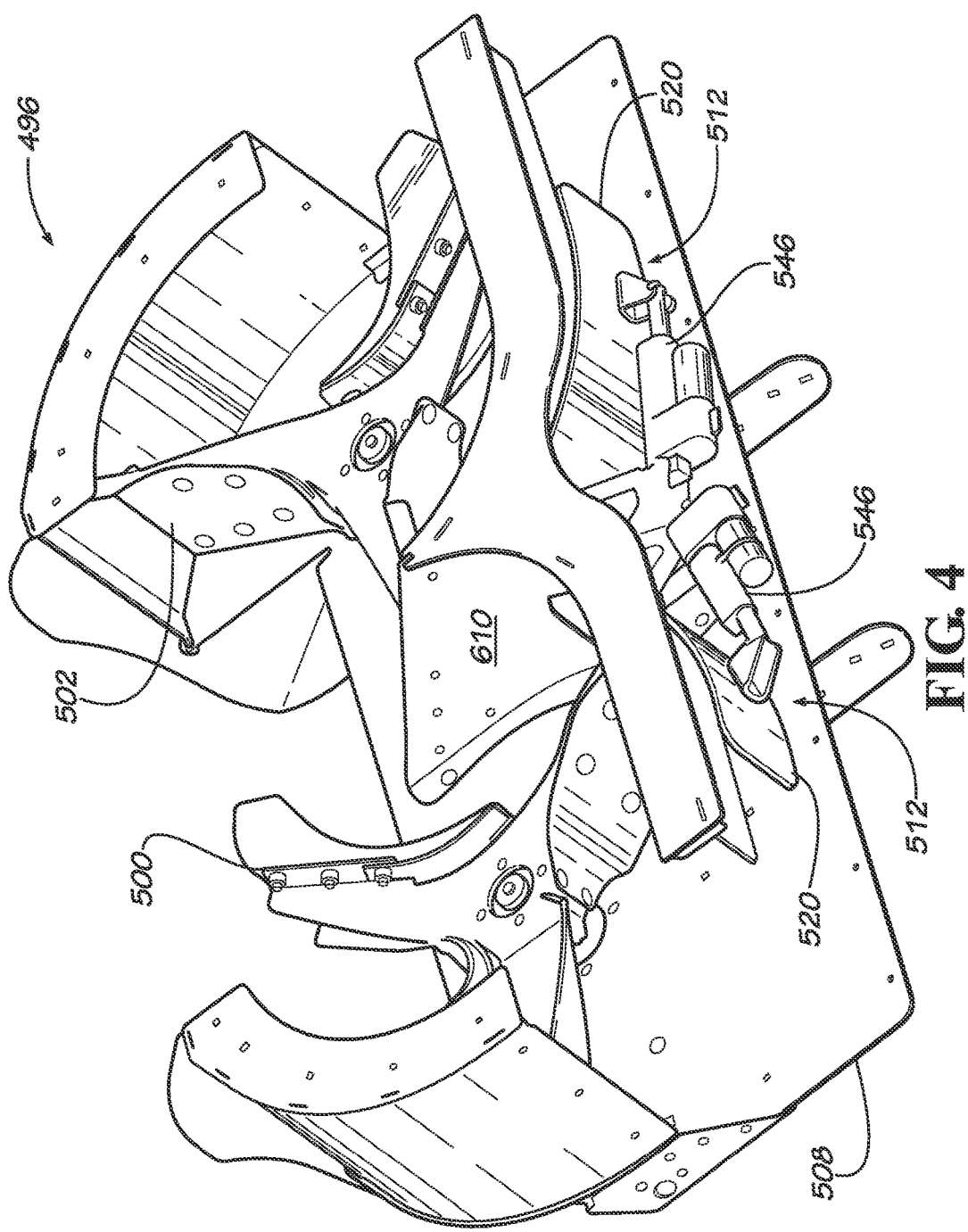

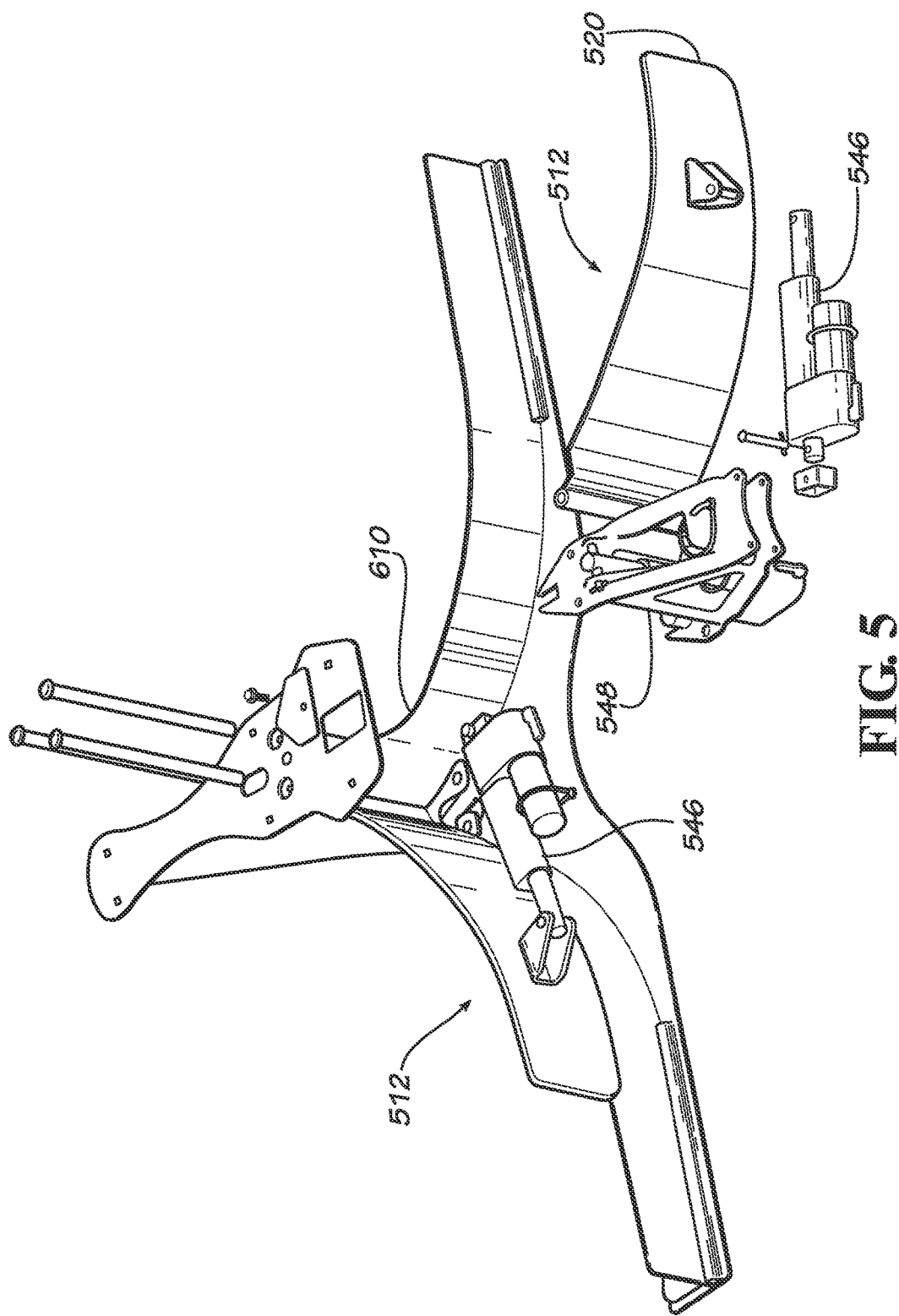

METHOD AND APPARATUS TO CONTROL RESIDUE WIDTH

CROSS REFERENCE TO RELATED APPLICATIONS

This is a continuation-in-part of U.S. patent application Ser. No. 13/275,508, entitled "WIND COMPENSATION OF RESIDUE SPREAD WIDTH", filed Oct. 18, 2011, which is incorporated herein by reference.

BACKGROUND OF THE INVENTION

1. Field of the Invention

The present invention relates to a system and method for optimization of crop residue spreading operation, with an adjustable spreader.

2. Description of the Related Art

In common harvesting operations where a combine is used to cut or pick up crop while traveling through a field, it is generally desired to leave the residue in a compact windrow for eventual pickup, or to evenly distribute the residue or MOG (material other than grain) evenly across the entire cut width. Returning the material to the ground provides nutrients for future crops. It is important that MOG be spread evenly such that all future plants have a consistent seed bed, but also because bunched or thicker distribution of straw and chaff, the residue or MOG, can make future field operations more challenging.

During the spreading of crop residue onto a field, weather elements such as wind can impact the flow of residue from the combine to the field. Wind can blow the residue during residue distribution so that residue ends up on the field in piles and not spread consistently across the field as desired.

What is needed is a system and method for optimization of residue spreading so that the residue may be spread evenly onto the field.

SUMMARY OF THE INVENTION

Embodiments of the present invention provide a system and method to optimize residue spread for even distribution of residue onto a field from a combine.

Embodiments of the present invention are directed to a system for discharging residue from an agricultural combine to a ground surface. The system including a spreader operatively connected to a rear end of the agricultural combine. The spreader having one or more impellers each having an axis of rotation and a housing. The impellers are operatively connected to the housing for rotating therein. The housing has an inlet for receiving a flow of residue, an outlet configured about a lateral side of the housing for discharging the flow of residue, and one or more residue flow distributors each pivotably movable in a direction generally parallel with the axis of rotation. Each flow distributor is configured to guide the discharged flow of residue sidewardly away from the spreader to the ground surface. The rotation of the one or more impellers discharge a flow of residue received through the inlet out through the outlet.

The invention in another form is directed to a spreader for discharging residue from an agricultural combine to a ground surface. The spreader is configured to be operatively connected to a rear end of the agricultural combine. The spreader having one or more impellers each having an axis of rotation and a housing. The impellers are operatively connected to the housing for rotating therein. The housing has an inlet for receiving a flow of residue, an outlet configured about a lateral side of the housing for discharging the flow of residue, and one or more residue flow distributors each pivotably movable in a direction generally parallel with the axis of rotation. Each flow distributor is configured to guide the discharged flow of residue sidewardly away from the spreader to the ground surface. The rotation of the one or more impellers discharge a flow of residue received through the inlet out through the outlet.

According to another aspect of one embodiment of the invention, adjusting the spreader to optimize the flow of residue by the spreader controller includes commanding one or more flow adjustors connected to one or more flow regulators pivotably connected to a lateral side of the spreader about a substantially vertical axis to pivot the flow regulator in a fore and an aft direction to the motion of travel of the combine. The regulator includes a fore portion, an aft portion and an upper portion connecting the fore and aft portions. The one or more regulator adjustors adjust the flow regulator from a facing away position from the side of the combine in which the flow regulator extends perpendicular to the combine motion of travel position to a rear combine facing away position in which the regulator extends in the opposing motion of travel direction of the combine. In the facing away position from the side of the combine, the flow of residue distributes sideward of the combine. In the rear combine facing away position, the flow of residue distributes directly behind the combine. The one or more regulator adjustors are selected from one of an electric actuator, pneumatic actuator, and hydraulic actuator. The spreader information further includes a current regulator position and the command from the processor includes an adjusted regulator position from the current regulator position.

According to another aspect of one embodiment of the invention, adjusting the spreader to optimize the flow of residue by the spreader controller includes commanding one or more impeller controller devices connected to one or more impeller motors each connected to the one more spreader impellers. The spreader controller adjusts the one or more impeller motors to drive a rotation speed of the one or more spreader impellers. The spreader setting information includes a current impeller rotation speed and the command from the processor includes an adjusted impeller rotation speed from the current impeller rotation speed.

According to another embodiment of the invention, the method further includes sensing a header width at a header detector connected on or about the combine and in proximity to a header of the combine, transmitting the header width from the header detector to the processor over the channel and modifying commands to the spreader controller from the processor for applying adjustments to the spreader to distribute flow of residue sideward and behind the combine to the ground surface at a width approximately equal to the header width.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1B illustrates a fragmentary, side view of the harvester from FIG. 1A;

FIG. 1E illustrates a bottom view of the flow guides of the residue spreader of FIG. 1C according to one embodiment of the present invention;

FIG. 2E illustrates a partial, rear, perspective view of the spreader of FIG. 1C with a regulator attached according to one embodiment of the present invention;

FIG. 2F illustrates a plan view of the harvester combine of FIG. 1A showing the operation of the combine for distributing crop residue perpendicular to the direction of travel of the combine according to one embodiment of the present invention;

FIG. 2G illustrates a plan view of an agricultural combine of FIG. 1A discharging crop residue rearwardly at an angle relative to the direction of travel of the combine according to one embodiment of the present invention;

FIG. 2H illustrates a plan view of the agricultural combine of FIG. 1A discharging crop residue rearwardly at an angle relative to the direction of travel of the combine to match the cut width of the combine header according to one embodiment of the present invention;

FIG. 2I illustrates a plan view of an agricultural combine of FIG. 1A with regulators of the spreader adjusted for westerly crosswind conditions and discharging crop residue rearwardly at an angle relative to the direction of travel of the combine to match the cut width of the combine header according to one embodiment of the present invention;

FIG. 4 is a perspective view of another embodiment of a spreader coupled to the harvester combine of FIG. 1A;

FIG. 5 is a perspective exploded view of a portion of the spreader of FIG. 4;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
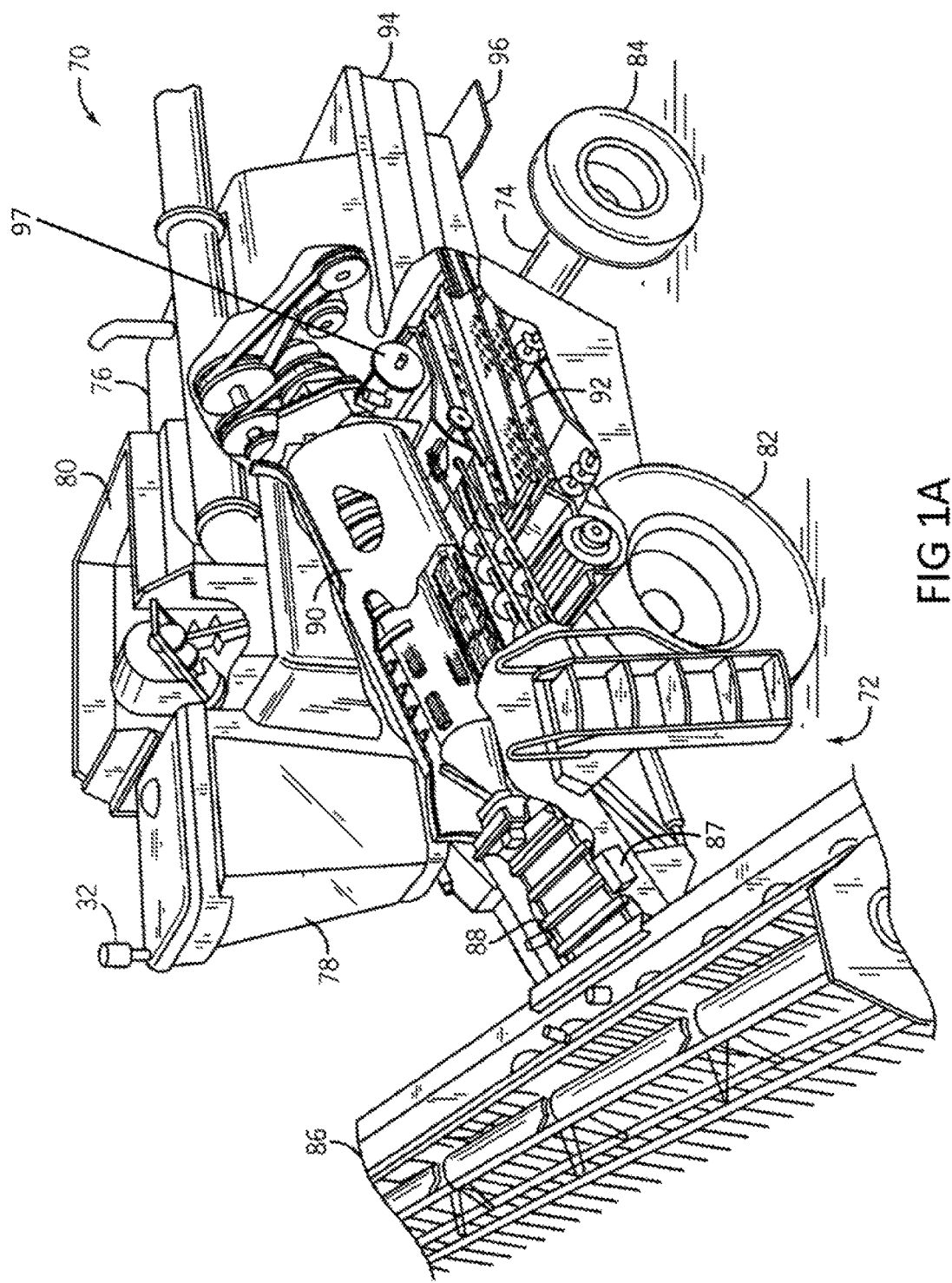
FIG. 1A illustrates a side view of a harvester combine with an attached header, threshing rotor, and spreader according to one embodiment of the present invention.

Referring now to the drawings, and more particularly to FIGS. 1A-1G, there is illustrated an agricultural system 70 which includes agricultural harvesting equipment such as a combine 72 which is used for harvest. Combine 72 is depicted as a mobile agricultural work vehicle including a frame 74, to which are installed a main body 76, an operator's station or cab 78, a grain tank 80, an engine (not shown), and ground support devices including drive wheels 82 and steerable wheels 84. However, the ground support devices could also be endless crawler tracks. Agricultural system 70 further includes communication and control system 18 (not shown in FIG. 1A), as further described in reference to FIG. 3, which can be integrated into combine 72 via electronic/electrical modules, cabling, flexible printed circuit harnesses, wiring harnesses, connectors, software, firmware, and the like.

Header 86 is shown in FIG. 1A, which is commonly referred to as a grain header and is typically utilized for harvesting smaller grains, such as, but not limited to, wheat and soybeans. Headers such as header 86 used for this purpose can have a variety of widths, for instance, from about twenty to about forty five feet, as is well known. Another well known header is a corn header, and will typically be of a six, eight, twelve or sixteen row variety, and will have an overall width of from about fifteen to about forty feet. Header 86, as well as other headers (not shown), are configured to be interchangeably mounted on the front end of a feeder 88 of combine 72 in the well-known, conventional manner, for configuring combine 72 for harvesting a particular crop. A header detector 87 is also shown in FIG. 1A, as connected on the combine 72, and is discussed further in reference to FIG. 3.

The crops harvested by a header 86 will be gathered up by the header 86 and conveyed by feeder 88 rearwardly and upwardly into the body of combine 72, for processing by a threshing system. The threshing system comprises a thresher 90, which is located within main body 76 and is disposed to receive the crop materials from feeder 88. Thresher 90 separates kernels of grain from larger pieces of other crop materials, referred to herein as MOG (materials other than grain). The grain kernels are then conveyed to a winnowing, or cleaning section 92, where smaller bits of MOG, debris, dust, etc. are removed by mechanical agitation and a stream of air. Although combine 72 is depicted as an axial-flow combine (i.e., having a thresher with a generally longitudinally disposed axis of rotation), the concepts described herein may also be used on other types of combines including those having threshers with transversely disposed axes of rotation.

Quite often a machine of this nature must harvest additional material other than the main product in order to complete the separation process. The excess material (herein referred to as crop residue) is typically chopped or shredded and propelled at the rear 94 of the combine 72 by a rapidly rotating beater 97 and into an inlet opening of the spreader 96, as generally denoted by arrow G, in FIG. 1G.

Attached on the combine 72 is a weather sensing device 32, as shown or similarly, or on or about the spreader 96 for optimizing the residue spreading function of the spreader 96 as within a communication and control system 18 of the combine 72. Weather sensing device 32 can also be connected to agricultural system 70 at a variety of other locations, and particularly to communication and control system 18. The weather sensing device 32 may be connected to the communication and control system 18, and the processor 56 within the communication and control system 18, over a channel. The channel may be a databus or a wireless communication link.

Weather sensing device 32 may contain any of the sensors to sense temperature, relative humidity, barometric pressure, cloud cover, and trends thereof. The weather sensing device 32 may sense one or more various wind characteristics, such as wind speed and wind direction. The weather sensing device 32 may measure the total wind speed and total wind direction. In other embodiments, the weather sensing device 32 can sense the perpendicular component of wind in relation to the combine 72.

Wind direction and speed change can reduce the harvesting machine's ability to spread the residue uniformly onto the ground surface. By using the information provided by the weather sensing device 32, such as wind speed and wind direction, adjustments for residue spreading may be automatically made in real time, and as further discussed in reference to FIG. 3, to compensate for such wind speed and wind direction, relative to the speed and direction of combine 72 travel. The communication and control system 18 may incorporate connection of various other sensors (not shown) in the combine 72 to receive information pertaining to combine 72 travel, including combine travel speed and travel direction, for transmission to processor 56 (see FIG. 3). For example, the communication and control system 18 may include a GPS, integrated into or on or about the combine 72.

The weather sensing device 32 may be packaged in a single unit with all the appropriate weather sensors so that it can be easily moved from vehicle to another vehicle. This may be especially important for vehicles that operate for only one or two months out of the year. The weather sensing device 32 may communicate across a channel 34 including the vehicle's data bus (see FIG. 3), such as a CAN bus, so that the data can be shared with other systems on the vehicle, thus optimizing vehicle operation. Sharing the data on the bus enables the vehicle's processor 56 to make automatic adjustments for the spreading operation of residue and MOG.

The weather sensing device 32 may also wirelessly transmit weather data to other vehicles or base stations so that other operations may use the data for fleet or vehicle optimization. This is especially helpful for those vehicles that are not equipped with their own weather sensing device. The weather sensing device 32 may provide the ability to set certain minimum or maximum weather parameter limits in order to preserve the quality of the crop being harvested or to insure the quality of the spreading. If these limits are exceeded an audible and/or visual warning may be given to the operator or the operation can be automatically terminated.

Combines equipped with a GPS (not shown) may be used to determine the direction and speed of the tractor. This data may be necessary in making the necessary corrections to compensate for wind speed and direction as analyzed and determined by the processor 56, further described in reference to FIG. 3.

Referring particularly to FIGS. 1B-1G, a rear end 94 of the combine 72 is shown, including a vertical crop residue spreader 96 operable for spreading straw, stalks, and other crop residue and MOG that has been separated from the grain of the crops thresher 90 of combine 72 located forwardly of rear end 94. The straw, stalks and the like are propelled rearwardly by rotating beaters or the like (also not shown) from the threshing mechanism and downwardly through a rear cavity of combine 72 to spreader 96 for spreading and optionally chopping. In other embodiments, a spreader may be positioned as a horizontal spreader that propels threshed residue in a like manner to a vertical spreader, wherein both may be designated as spreader 96.

Spreader 96 includes a housing 98 of sheet metal or other construction containing a pair of side by side rotary impellers 100 and 102 rotatable in opposite predetermined rotational directions, denoted by arrows A and B, about a pair of rotational axis 104 and 106, respectively. Housing 98 defines a forwardly and upwardly facing inlet opening for receiving the residue flow from the threshing system, and a downwardly facing discharge opening 110, or outlet, through which the residue is propelled downwardly and in opposite sideward directions by impellers 100 and 102, respectively. The discharge opening 110 may be configured about the lateral side of the housing 98. Here, it should be understood that impellers 100 and 102 are representative of a variety of rotary devices that can be utilized in a spreader of this type, such as a rotor having fixed blades, or carrying a plurality of knives, such as flail knives, for propelling the crop residue outwardly from the housing from the inlet and out through the outlet. The spreader can additionally optionally include a rank of fixed knives through which the rotating knives pass for chopping crop residue.

Impellers 100 and 102 are rotated by suitable driving elements, herein referred to as motors 160 (see FIG. 1F), such as by conventionally constructed and operable hydraulic motors powered by pressurized hydraulic fluid received from a pump (not shown) of combine 72, an electric motor, belt, or the like, again in the well known manner. Rotational axes 104 and 106 extend at least generally in the fore and aft directions, that is, generally forwardly and rearwardly with respect to combine 72, and are generally horizontal or oriented at a small acute angle to horizontal, depending on an orientation or tilt of spreader 96 on combine 72, which can be optionally variable and adjustable in the well known manner.

Residue flow within housing 98 is propelled by rotating impellers 100 and 102 in the predetermined rotational directions A and B along circumferential flow paths, at speeds equal to or increased relative to the inlet speed of the residue flow such that the residue does not build up at the inlet and is expelled from housing 98 through discharge opening 110 at a corresponding speed. In the instance wherein spreader 96 is solely used for spreading, the speed imparted to the residue by impellers 100 and 102 will be sufficient for airborne travel of the residue a substantial sideward distance from combine 72 for deposition on regions of the agricultural field over which combine 72 has just traveled and from which the crops have been harvested.

As noted above, it is desired in many instances to distribute the crop residue discharged by impellers 100 and 102 substantially evenly over the width of a swath of the field from which the crop has just been harvested by combine 72, which width is typically defined by the overall width of a harvesting head 86 of combine 72, which width can be as much as thirty to forty feet in the instance of some heads currently in use. Spreader 96 may include a pair of adjustable crop residue flow distributors 112 connected to or about the discharge opening 110, or outlet, about the lateral side of the housing 98. Crop residue flow distributors 112 are mirror images of one another, and thus can be described and discussed singularly when appropriate, and are positioned for use in cooperation with respective impellers 100 and 102 of spreader 96 for receiving and carrying flows of crop residue discharged through discharge opening 110, in opposite sideward directions outwardly away from spreader 96, for distribution in a desired pattern on sides of a just harvested swath of a field over which combine 72 is moving. Here, it should be understood that by the term "sideward" what is meant is a direction transverse the fore and aft directions, the term "sidewardly outwardly" thus meaning sidewardly away from a center line 114 of spreader 96, the term "sidewardly inwardly" meaning closer to center line 114.

Each of flow distributors 112 preferably includes a flow guide of suitable, rigid construction, such as of sheet metal, or plastics, having a first end portion 118 supported adjacent to discharge opening 110 in the vicinity of center line 114 in a position so as to receive at least a portion of the crop residue flow discharged through about the outlet. Flow guide 116, or guide 116, includes a second end portion 120 opposite first end portion 118, and a fore edge 122 and an opposite aft edge 124 extending between first and second end portions 118 and 120 defining a crop residue flow surface 126 extending between end portions 118 and 120 for guiding and carrying the received crop residue flow sidewardly outwardly away from spreader 96 and distributing the crop residue, illustrated by strings of oppositely directed arrows C and downwardly directed arrows D in FIG. 1C, for distribution in a pattern on a field on the ground surface, represented by dotted line 128 in FIG. 1C, having desired characteristics, such as uniformity and evenness of crop residue distribution.

Flow guide 116 is additionally preferably elongate in the sideward direction, and crop residue flow surface 126 preferably has an upwardly directed concave shape. Additionally, at least aft edge 124 includes a tapered portion 130 which extends diagonally forwardly and sidewardly outward toward second end portion 120, such that a portion of crop residue flow surface 126 adjacent to second end portion 120 of the flow guide, is reduced in fore and aft extent, compared to a portion of surface 126 adjacent to first end portion 118.

Each of flow guides 116 is preferably supported on combine 72, and more preferably on spreader 96, by adjustable support structure 132. Support structure 132 preferably includes a rear plate 134 mountable in a suitable manner, such as using bolts or other fasteners, to a central region of rear wall 108 of spreader 96, so as to be at least generally aligned with center line 114 of spreader 96. Support structure 132 includes a center flow divider 136 connected to plate 134 and extending forwardly therefrom, so as to be disposed between impellers 100 and 102 for dividing crop residue flow therebetween, and for supporting flow guides 116 for fore and aft movement relative to structure 132, as denoted by arrows E, and also upward and downward pivotal movement relative thereto, as denoted by arrows F. The first end portion 118 of each of flow guides 116 is connected to support structure 132 by a fore and aft extending pivot pin 138 retained in position by a cotter pin 140. Additionally, pins 138 support a center bracket 142 which extends downwardly from divider 136 and is movable in the fore and aft directions with flow guides 116. Each of flow guides 116 includes a bracket 144 on an underside thereof about midway between end portions 118 and 120.

As shown in FIG. 1B-1G, this particular combine uses a spreader 96 that includes two impellers 100, 102 to perform the spreading process, along with the flow distributors 112, which are used to aid the impellers in the spreading process. By adjusting the flow guides 116, the residue spreading can be adjusted in order to accommodate different combine header widths or changes due to weather conditions, including wind changes, and still perform a quality job of residue distribution. Flow guide adjustors 146 or guide adjustors 146, which may be remotely controlled actuators, which can be electric, pneumatic and/or hydraulic, and are connected to a processor 56 (see FIG. 3), which is able to determine the proper adjustment of the flow guides 116 as a function of wind speed and direction and command the flow guide adjustors 146 to raise or lower the flow guides up or down in direction F (see FIG. 1D). By adjusting the flow guides 116 closer to the impellers 100, 102, in a vertical direction away from the ground surface, residue is thrown from the impellers 100, 102 further to the sides and sidewardly outwardly of the combine 72 making for a wider distribution and longer range along path C. In contrast, by adjusting the flow guides 116 away from the impellers 100, 102, in a vertical direction towards the ground surface, residue is not projected with as much force and velocity making the spreading from the side of the combine 72 more narrow and directed sidewardly inwardly in distribution with less range along path C. For example, if the wind is blowing from left to right, the flow guides can be adjusted independently of each other in order for the residue being thrown to the left side of the combine to be thrown further than to the right in order to achieve uniform distribution, requiring the left flow guide being adjusted closer to the impeller 100 and the right flow guide being lowered away from impeller 102. Conversely, the right side can be adjusted in order to prevent the residue from being thrown too far relative to the left side. In addition, the speed of each impeller can be adjusted independently in order to compensate for wind speed and direction, i.e. faster the speed, the farther it throws the residue.

Figure 1C:
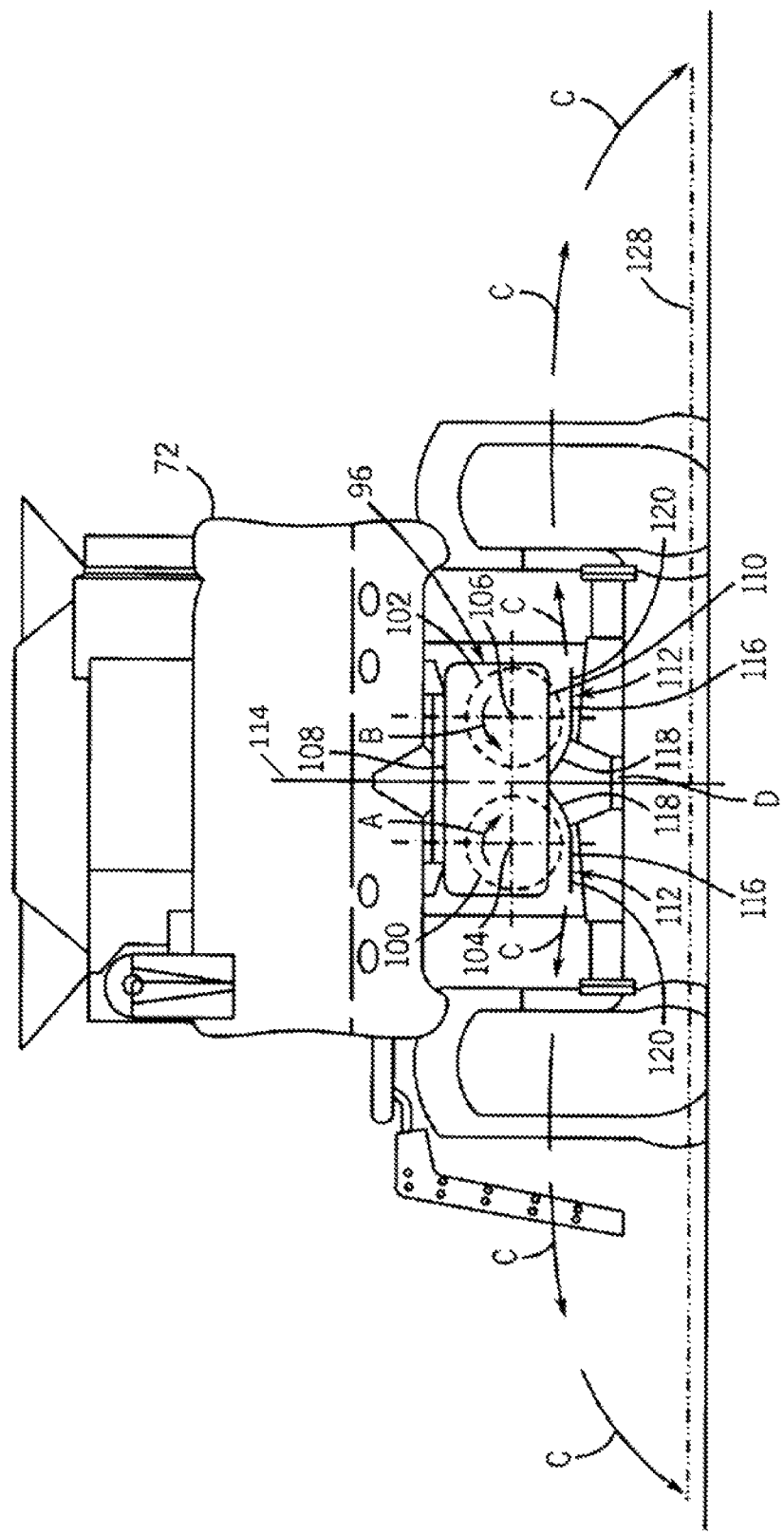
FIG. 1C illustrates an end view of the harvester combine of FIG. 1A, particularly showing the residue spreader on the rear of the combine according to one embodiment of the present invention.
Figure 1D:
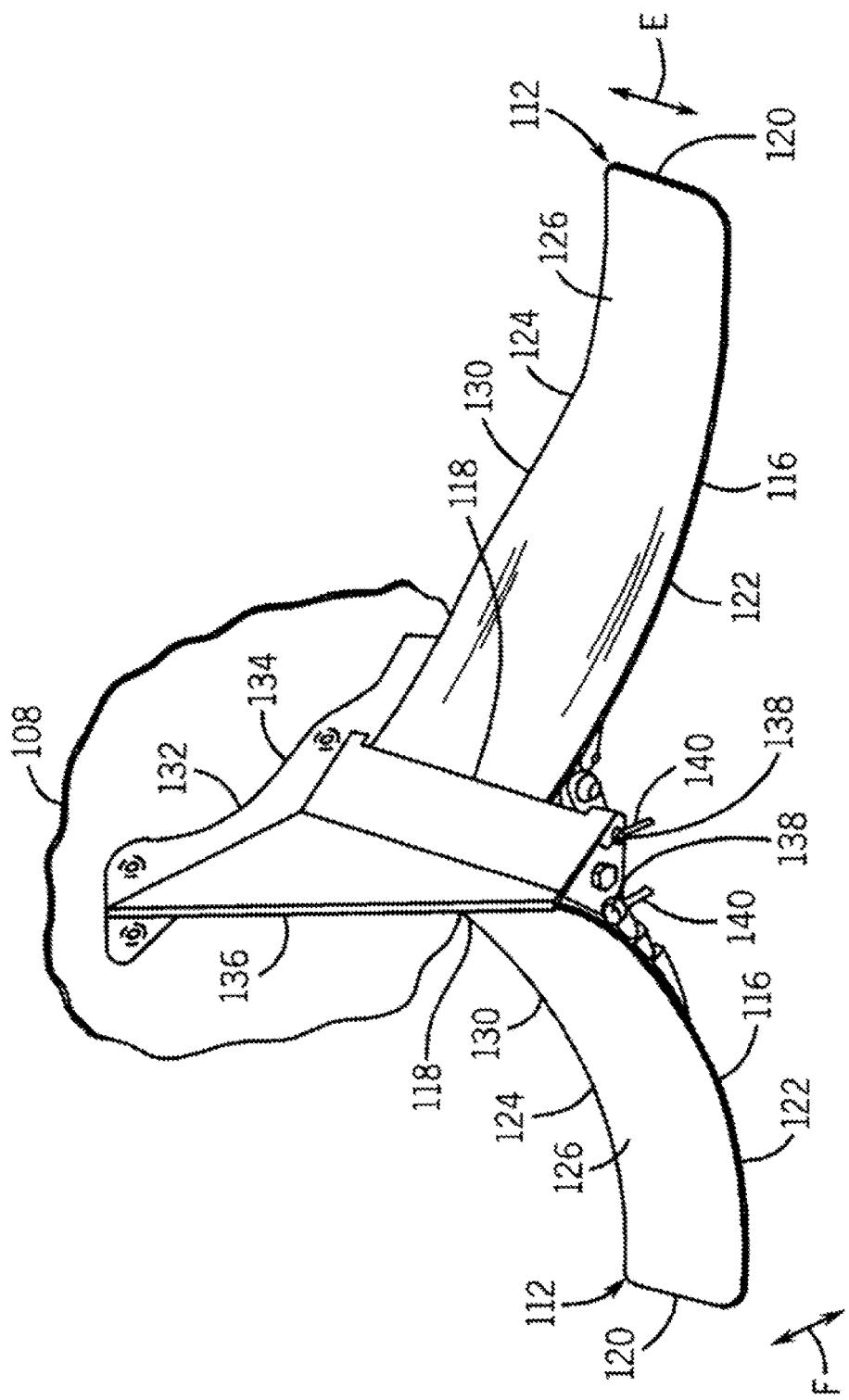
FIG. 1D illustrates a perspective view of the flow guides of the residue spreader of FIG. 1C according to one embodiment of the present invention.
Figure 1F:
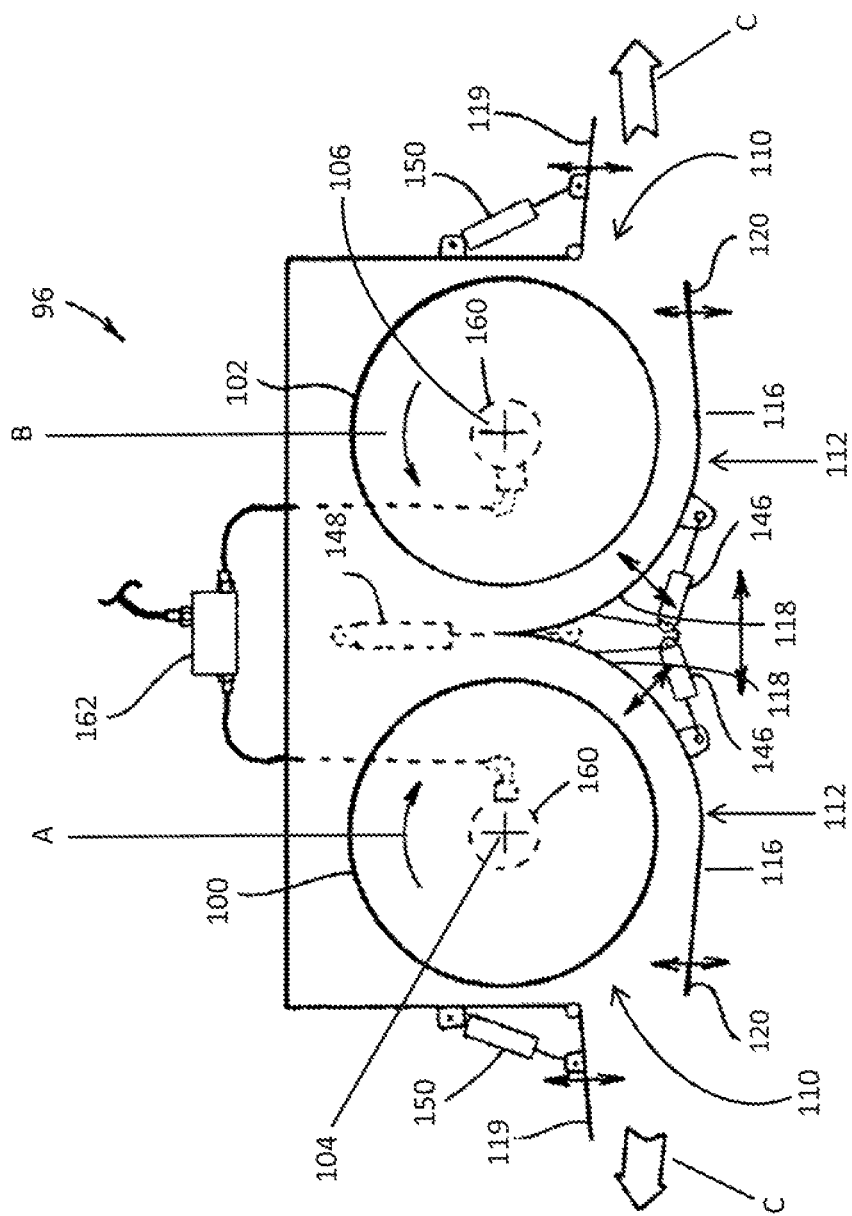
FIG. 1F illustrates a close-up view of the spreader from FIG. 1C according to one embodiment of the present invention.

An upper flow guide 119 may also be incorporated above the outlet on either side of the spreader, as shown in FIG. 1F. The upper flow guide 119 can be lowered or raised by an upper flow guide adjustors 150, which may too be remotely controlled actuators, which can be electric, pneumatic and/or hydraulic, and connected to a processor 56. The upper flow guide 119 may serve to bank crop flow towards the ground surface under the spreader when the upper flow guide is lowered or allow the crop flow to travel further from the spreader from the impellers with the upper flow guide 119 raised up.

Figure 1G:
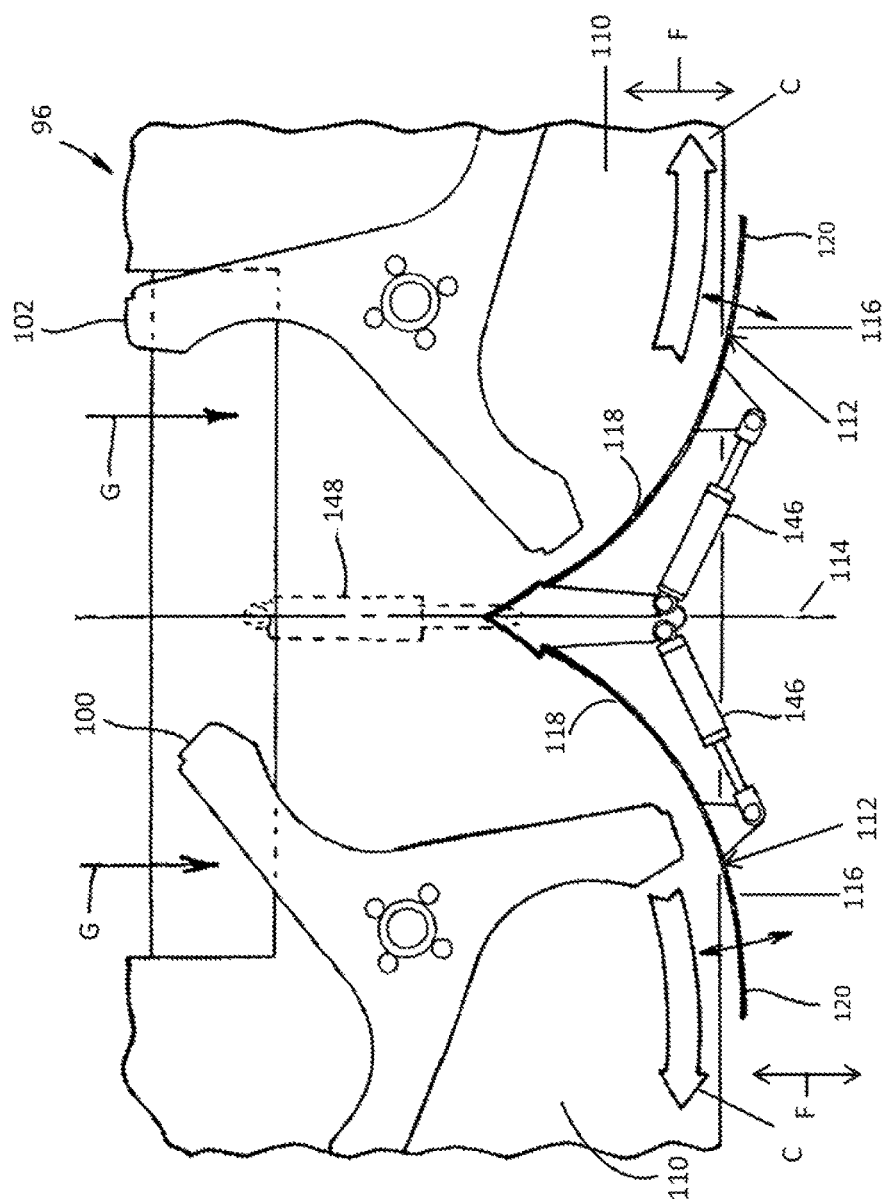
FIG. 1G illustrates a close-up view of the spreader from FIG. 1F according to one embodiment of the present invention.

Referring to FIG. 1E-1G, there is an additional guide adjustor 148 which may be an actuator which can also be connected to processor 56, and is controlled automatically in order to achieve optimum residue distribution. The additional guide adjustor 148 can adjust, or swing, the guides 116 in direction E, in a lateral direction parallel to the ground surface, to a position nearer or further away from the rear of the combine 72. The further the guides 116 are positioned from the rear of the combine in direction E, the larger the variable clearance 145. A larger variable clearance 145 allows material to drop straight down without being projected by the impellers 100, 102. A larger variable clearance 145 is necessary if more material is desired directly behind the combine 72 as opposed to towards the sides.

As shown in FIGS. 1F and 1G, the positions or orientations of guides 116 are adjustable or settable by flow guide adjustors 146 and additional guide adjustor 148 for determining a width of a pattern of deposition of the crop material on a field. Flow guide adjustors 146 and additional guide adjustor 148 may be actuators that can be a linear actuator or actuators, such as, but not limited to, a fluid cylinder or an electric linear actuator, a rotary actuator, or any other suitable type actuator of well known construction and operation.

Referring to FIGS. 1F and 1G, impellers 100 and 102 of spreader 96 are drivingly rotated by a suitable drive, such as motors 160, which can be, for instance, fluid or electric motors, controlled by an impeller control device 162. Impeller control device 162 can include, for instance, one or more remotely controllable fluid control valves, or electric motor controllers, or a suitable belt drive, as desired or required for a particular application, controllable for varying a speed of rotation of the impeller or impellers, for changing one or more parameters of crop discharge from the spreader, such as the width of a pattern of deposition of crop residue on a field. The impeller control device 162 is connected to a processor 56, wherein the processor 56 commands the impeller control device 162 to adjust the speed of the impellers 100 and 102. The faster the impellers 100 and 102 are rotated by the control device, the further the residue travels in path C from the combine 72 (see FIG. 1C). The slower the impellers 100 and 102 are rotated by the control device, the less distance the residue travels in path C.

Addressing environmental conditions, under no or low wind conditions, aligning the sideward position or location of the pattern of crop residue deposition relative to a swath through a field can be a simple matter of making appropriate adjustments as discussed above, symmetrically about a forwardly and rearwardly extending centerline of combine 72. However, when wind conditions are sufficient for affecting the location of crop residue deposition, for instance when blowing sidewardly, and/or frequently changing, some adjustments will likely be necessary to maintain or achieve the desired alignment with the swath. There may also be internal conditions which require this, such as in feeding of a greater amount of crop material to one side of the spreader or the other. Adjustments may also be required when turning and changing direction. Thus it is contemplated that actuator or actuators 146, 148, 150, and impeller control device or devices 162, as applicable, can optionally be suitably controllable for providing a capability for making asymmetrical adjustments to accommodate such requirements. For instance, the speeds of motors 160 may be adjusted differently, and/or one or more of the distributors 112 may be adjusted differently than its counterpart on the other side of the spreader, to provide desired distribution and alignment characteristics.

This same methodology could be used in machines which use fan type spreaders in order to distribute granulated fertilizers on a field. These machines use impellers to throw the granules to each side of the applicator. The spread width can be adjusted by increasing or decreasing the speed of the impellers, adjusting the height of the impellers, or adjusting the vanes which are typically located on both sides of the impeller in order to negate the effects of a lateral wind.

Figure 2A:
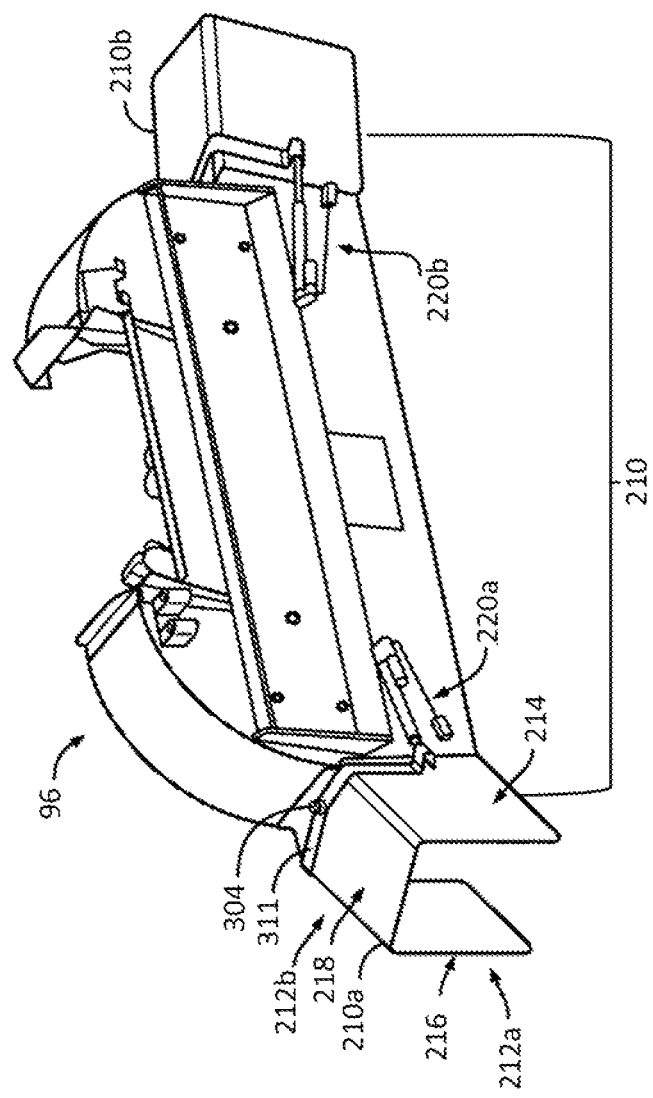
FIG. 2A illustrates a rear, perspective view of the spreader with regulators according to one embodiment of the present invention.
Figure 2B:
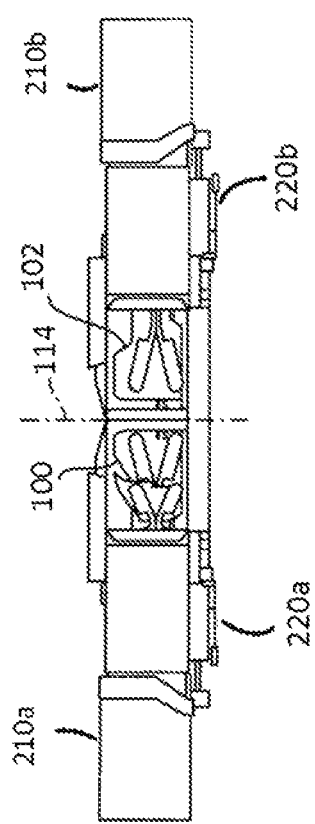
FIG. 2B illustrates a plan view of the spreader and regulator of FIG. 2A according to one embodiment of the present invention.

In another embodiment, and as shown in FIG. 2A, a flow regulator 210 or regulator 210, two of which are shown, a left regulator 210a and a right regulator 210b, are mounted to the outwardly lateral sides of the spreader 96. Each regulator 210 may be described as a chute. The regulator 210 is generally sized to complement, circumvent, or otherwise surround or partially surround the discharge opening 110 (see FIG. 1F) of the spreader 96, such that the regulator 210 can readily receive an uninterrupted flow of crop residue from the spreader 96. That is, the regulator 210 forms a flow path for the flow of crop residue through the regulator 210 that is in fluid communication with the discharge opening 110.

The regulator 210 is pivotably connected to the lateral side of the spreader 96 by a pivot mechanism 304, about a substantially vertical axis. Such pivot mechanisms 304 may be known in the art. Exemplary pivot mechanisms can include e.g., a nut and bolt fastener 304, as shown in FIG. 2A. For example, the regulator 210 can be mounted to the spreader 96 by a support structure 311. The support structure 311 can be a pair of L-shaped brackets that are attached to the regulator 210, and further pivotally connected to the spreader 96 by the pivot mechanism 304. Preferably, the regulator 210 is pivotably connected to the spreader 96 so as to pivot in the fore and aft directions.

Figure 2C:
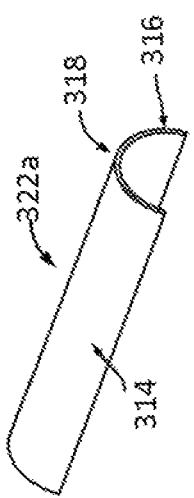
FIG. 2C illustrates a perspective view of another type of regulator according to one embodiment of the present invention.
Figure 2D:
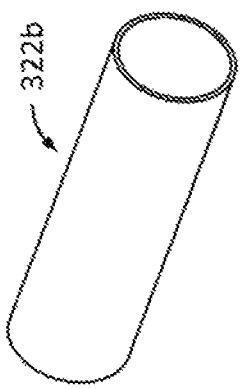
FIG. 2D illustrates a perspective view of another type of regulator according to one embodiment of the present invention.

The regulator 210 is preferably configured with an aft portion 214, a fore portion 216 and an upper portion 218 connecting the aft and fore portions 214, 216. The aft 214, fore 216 and upper portions 218 can be individual units or a single combined unit, such as a generally arched shaped unit. Preferably, the regulator 210 is configured with a planar aft 214, planer fore 216, and planer upper portion 218, as shown in FIG. 2A. However, the regulator 210 can alternatively be configured as an inverted "U" or arched configuration 322a (FIG. 2C) having an aft portion 314, a fore portion 316, and an upper portion 318. The arched configuration 322a can arc up to 360 degrees 322b (FIG. 2D). The regulator 210 can be constructed out of any rigid construction material, such as a metal, a plastic, a composite or any other material suitable for its intended use.

Referring again to FIG. 2A, the fore portion 216 is configured to deflect a flow of crop reside sidewardly and/or rearwardly (i.e., towards the lateral and aft direction of the combine 72). The fore portion 216 can be of a planar configuration (FIG. 2A).

The regulator 210 also includes remotely controllable regulator adjustors (or adjustors) 220a, 220b for independently adjusting each of the regulators 210a, 210b in either the fore or aft direction. The remotely controllable adjustors 220a, 220b can be, for example, remotely controllable actuators 220a, 220b. Referring to FIG. 2A, the remotely controllable actuators 220a, 220b are connected to a rearward facing end of the combine 72. The remotely controllable actuators 220a, 220b are connected to the vertical spreader 96 for effecting fore and aft rotation of the regulators 210a, 210b about a substantially vertical axis. That is, one end of the actuator 220a is pivotably connected to a rear portion of the vertical spreader 96 while the other end of the actuator 220a is pivotably connected to a rear portion 214 of the regulator 210. Further, the remotely controllable actuators 220a, 220b can be any suitable commercially available device, such as, but not limited to, electric or other motors, cylinders, solenoids, linear actuators, electric actuators, pneumatic actuators, or hydraulic actuators, or the like, and can be controlled from any suitable location of the combine 72, such as an operator cab (not shown). The remotely controllable actuators 220a, 220b may also be commanded to position by and in connection with processor 56, discussed further in reference to FIG. 3.

The regulator's length extending laterally and rearwardly can vary depending on the required use. However, the length of the regulator 210 is preferably about two feet in length. Moreover, each of the aft, fore and upper portions 214, 216, 218 can each independently vary in length, however, each of the aft, fore and upper portions 214, 216, 218 are preferably configured to be about the same length. Furthermore, the regulator 210 can be configured such that a distal end 212a of the regulator 210 has a smaller cross-sectional area than a proximal end 212b of the regulator 210.

An important advantage of the regulator 210 is the ability to adjustably position each of the regulators 210a, 210b (FIG. 2A) through a range of fore and aft positions. The ability to vary the fore and aft position of the regulators 210a, 210b allows the combine 72 to more advantageously distribute and adjust the distribution pattern of crop residue over a field.

FIG. 2F-2I illustrate the utility of the regulator 210. The spreader 96 is directed to flow MOG directly perpendicular to the direction of travel (the forward direction) thereby distributing crop residue or MOG evenly across the cut width. Such a distribution can be accomplished with the perpendicular orientation of the flow of MOG under no external environmental conditions, such as crosswinds. The matched distribution of MOG by the spreader 96 is illustrated by arrows C. As shown in FIG. 2F, regulators 210a, 210b point in position away from the side of the combine 72, as extending perpendicular to the side of the combine 72.

FIG. 2G illustrates the regulators 210a, 210b operated at an angle of about 135 degrees relative to the forward direction of travel, represented by arrow H, as pointing more to the opposing direction of travel of the combine 72. In this position, and under conditions of no external crosswinds, the spread of MOG represented by arrows C, is configured to be distributed over the cut width of the header.

FIG. 2H-2I illustrate the pivotal adjustments of the regulators 210a, 210b necessary for optimal distribution of MOG under conditions of crosswinds, represented by arrows I, perpendicular to the direction of travel, represented by arrow H. As shown in FIG. 2H, the regulators 210a, 210b are angled similar to that shown in FIG. 2G so as to match the cut width of the combine 72. However, under crosswind conditions (represented by arrows I), the flow distribution of MOG is expected to be non-uniform due to the crosswind.

The regulators 210a, 210b can be adjusted to be positioned as shown in FIG. 2I. As a result, the regulators 210a, 210b can compensate for environmental conditions, such as crosswinds I. For example, the combine's right-hand side regulator 210b is angled perpendicular to the direction of travel and directly into the crosswinds I. The combine's left-hand side regulator 210a is angled at about a 160 degrees angle relative to the direction of travel H or about 60 degrees relative to the direction of the crosswinds I, to advantageously compensate for the crosswinds I influence on the spread of MOG. In other words, the regulator 210b is adjusted an angle alpha relative to its original position, while the regulator 210a is adjusted an angle beta relative to its original position to compensate for crosswinds I. The advantageous effects of the pivotable regulators 210a, 210b compensate for environmental conditions.

Referring now to FIG. 2E, in another embodiment, the left regulator 210b includes an aft portion 214 with a tapered portion 222. The tapered portion 222 tapers in an outwardly and upwardly direction i.e., the lateral superior direction. The tapered portion 222 advantageously distributes the flow and spread of crop residue more gradually across a swath of a field, compared to a non-tapered regulator.

Other types of regulators 210 are further described in application Ser. No. 12/629,669, entitled "A Regulator of Residue Flow for Spreading Devices on Agricultural Combines", which is fully incorporated in the present disclosure.

Figure 3:
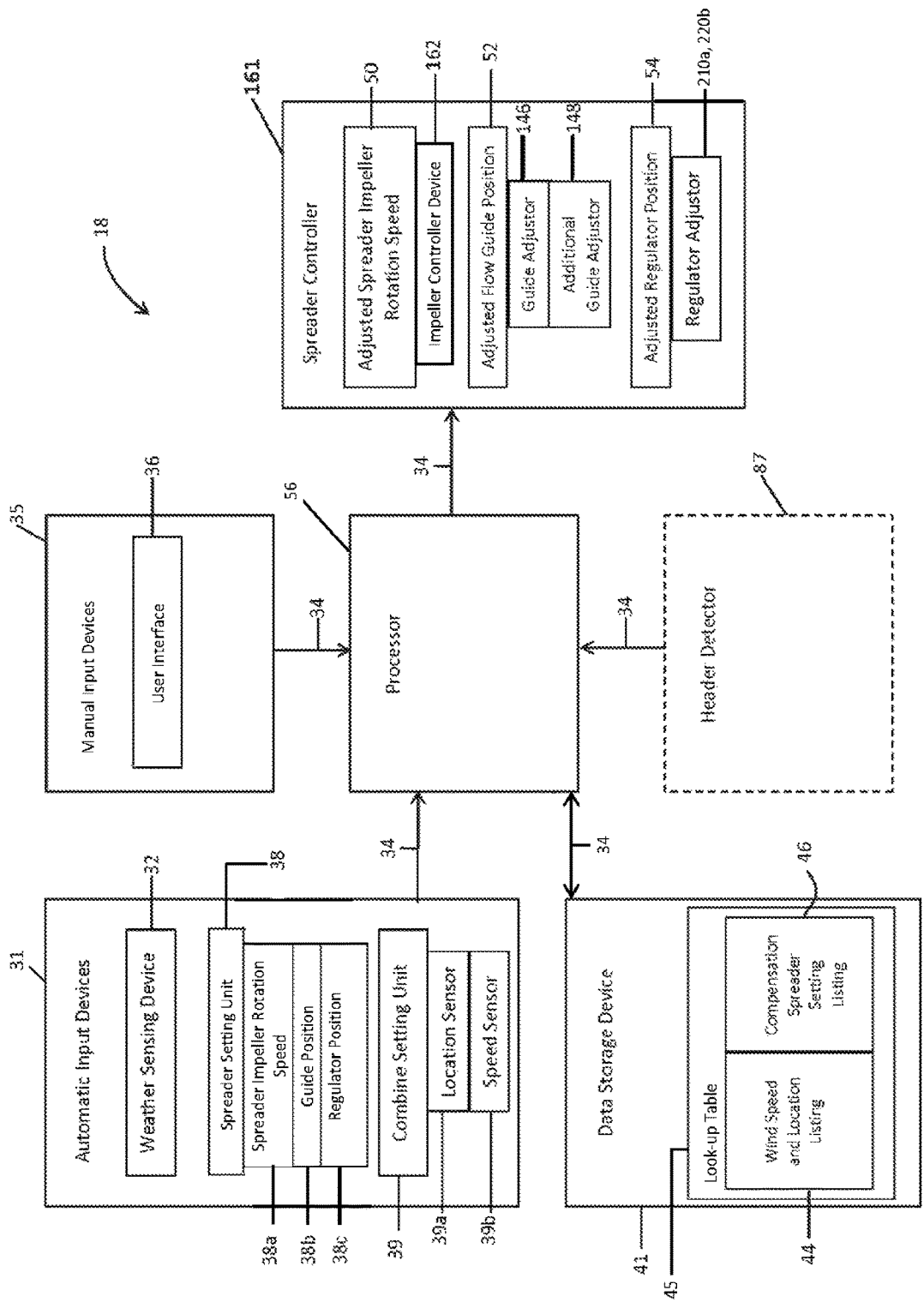
FIG. 3 illustrates a communication and control system in which the spreader is controlled according to one embodiment of the present invention.

FIG. 3 illustrates a communication and control system in which the spreader is controlled according to one embodiment. Communication and control system 18 can include a channel 34, which may be a wireless communication link or databus, and which is connected between a processor 56 and at least one of input devices, data storing devices, detectors, and controllers. At least one input device can be connected to channel 34. Input devices can include, but are not limited to, automatic input devices 31 and manual input devices 35 (or manual operator input devices 35). The manual input device 35 may include a user interface 36. User interface 36 can include keyboards, keypads, readable memory drives, switches, dials, indicators, and other input devices to allow an operator to provide settings and input to system 18. The automatic input device 31 may include the weather sensing device 32, a spreader setting unit 38, and a combine settings unit 39. The spreader setting unit 38 may include various spreader setting information including, but not limited to, spreader impeller rotation speed 38a, guide position 38b for distributor 112, and regulator position 38c. The spreader setting unit 38 may sense any adjustments at the spreader including, but not limited to, spreader impeller rotation speed 38a, guide position 38b for distributor 112, and regulator position 38c. The spreader impeller rotation speed 38a in the spreader setting unit 38 may be the current impeller rotation speed occurring in the spreader 96. The spreader guide position 38b in the spreader setting unit 38 may be the current guide position present in the spreader 96. The regulator position 38c in the spreader setting unit 38 may be the current regulator position present in the spreader 96. The combine setting unit 39 may include various combine settings including, but not limited to, combine location sensing 39a (such as a GPS) from, a combine location sensing device, which may provide latitude/longitude coordinates and vehicle direction in real-time. The combine setting unit 39 may also include combine speed sensing 39b from a combine speed sensor device, sensing the speed of the combine. Both the combine speed sensing and location sensing devices may be located on or about the combine 72.

At least one data storage device 41 is connected to channel 34. Data storage device 41 can be, but is not limited to, data storage devices or peripheral devices such as a CD, DVD, floppy or other drives; processor memory, flash memory, EEPROMs, RAM, ROM, etc. The data storage device(s) 41 can include a look-up table 45. The look-up table 45 stores wind information entries, which may include wind speed entries and wind location entries in a wind speed and direction listing 44. The look-up table 45 may also compensation spreader setting entries in a compensation spreader setting listing 46. The wind speed and direction listing 44 may be adjoined to the compensation spreader setting listing 46. The look-up table 45 provides the processor 56 with a compensation spreader setting 46, regarding spreader impeller rotation speed, distributor position, and/or regulator position based on the wind speed and direction provided for in for example, the wind speed and direction listing 44 of the look-up table 45. In other embodiments, the look-up table 45 may also include a listing of combine speed and direction. Combine speed and direction may also be considered as a factor, in addition to wind speed and direction, to link with a compensated spreader setting 46 within table 45.

A processor 56 is connected to channel 34 to communicate with the automatic input device 31, manual input device 35, and data storage device 41. Processor 56 can be a microprocessor, an application specific integrated circuit, a single or multiple board computing device, or other computing/controlling device. The processor 56 analyzes sensed information provided from the automatic input devices 31. The processor 56 also analyzes any operator defined settings provided from, for example, a user interface 36 or any other manual input device 35. Commands may be provided from the manual input device 35 to override commands from the processor 56. The processor 56 receives wind speed and wind direction characteristics through a communication connection or channel with the weather sensing device 32. The processor also receives spreader impeller rotation speed, distributor position, and/or regulator position from the spreader setting unit 38. The processor 56 may also receive combine information such as combine location and traveling speed from the combine settings unit 39. In other embodiments, combine information entries including at least one of combine location entries and combine speed entries may be stored in the look-up table 45 in the data storing device 41. Based on the information received from the automatic input devices 31, the processor 56 may then compare the received information with data stored at the data storing device 41.

The processor 56 matches wind speed and direction information received from the weather sensing device 32 with wind speed and direction entries in the wind speed and direction listing 44 in the look-up table 45. The processor 56 may match the wind speed and direction information received with an approximately equal wind speed and direction entries in the wind speed and direction listing 44. Linked to each wind speed and direction listing 44 is a compensation spreader setting 46. The processor 56 retrieves the compensation spreader setting 46 linked to the wind speed and direction setting 44 matched to the information provided from the weather sensing device 32. The processor 56 may analyze combine location and speed sensing information to retrieve compensation spreader settings. The combine information entry may also be adjoined to the compensation spreader setting for the processor 56 to match and retrieve a comparable compensation spreader entry. In other embodiments, processor 56 may also match combine location and/or speed information received from the combine settings unit 39 with a combine location and speed listing (not shown) provided for in the look-up table 45. The combine location and speed listing may be linked with wind speed and direction listings 44 as additional factors in link with compensation spreader settings 46. The processor 56 retrieves the compensation spreader setting 46 linked to the combine location and speed listing and/or the wind speed and direction setting 44.

The processor 56 commands the spreader controller 161 to then adjust various spreader components to conform to the compensation spreader setting 46 retrieved by the processor 56 from the data storage device 41. In other embodiments, the processor may calculate the appropriate compensating spreader setting by analyzing wind speed and wind direction without having to retrieve spreader settings from a look-up table 45 in the data storage device 41. In other embodiments, the processor 56 may generate a compensating spreader setting by utilizing the look-up table 45 and analyzing and/or calculating other information such as combine location and combine speed in addition.

The user interface 36 is preferably located in cab 78 (see FIG. 1) of combine 72. User interface 36 can include, for instance, a switch or touch screen, and is usable by an operator for inputting commands to processor 56 for inputting information, such as, but not limited to, crop type and/or conditions, and for adjusting the spreader setting or settings. Analysis and calculation for configuring the spreader controller 161 automatically by the processor 56, as further discussed below, may be overridden by input commands from the operator about the user interface 36.

Automatic input devices 31 can include connections from the input devices 31 directly to the processor via channel 34, as shown in FIG. 3. Input devices 31 may communicate with processor 56 wirelessly, including but not limited, to over a radio frequency or network. Input devices 31 can be connected to or include an appropriate commercially available transmitter for sending wireless information to the processor 56 having a receiver.

Processor 56 communicates with spreader controller 161 over connection on channel 34. The spreader controller 161 may include the impeller controller device 162 (see FIG. 1F) for adjusting the spreader impeller rotation speed 50 of impellers 100, 102. The spreader controller 161 may also include the guide adjustor 146 and additional guide adjustor 148 for adjusting guide position 52, in both a vertical and horizontal direction, of guides 116 of distributors 112. The spreader controller 161 may also include regulator adjustors 220a, 220b for adjusting regulator position 54 of regulators 210. Some combines 20 may include one or more of the various spreader controllers 161. The one or more spreader controllers 161 available in the combine 72 may depend on whether, for example, the combine 72 implements flow guides 116, regulators 210, or both. The processor may command an adjusted spreader impeller rotation speed 50, an adjusted guide position 52, and/or an adjusted regulator position 54 from the current speed or position.

The processor 56 transmits a command to the spreader controller 161 to include adjustment of impeller 100, 102 rotational speed through the impeller controller devices 162, or of any one of the guide adjustor 146, the additional guide adjustor 148, and/or the regulator adjustor 220a, 220b to a predetermined position/speed. The communication and control system 18 is a closed-loop system, in which the processor 56 continuously receives information from the input devices 31, 35; analyzes the information; and commands the spreader controller 161 to act accordingly to ultimately adjust the flow of residue from the rear of the combine 72 to provide for even distribution of flow residue for distribution in a pattern on a field or ground surface, represented by dotted line 128 as shown in FIG. 1C. The closed-loop system also means that the processor 56 can verify that commands sent to the spreader controller 161 are compensating for wind directions and wind speed.

When commanding the regulator adjustors 220a, 220b to position the regulators 210, the processor 56 may analyze the wind direction and speed information to determine, for example, if a more parallel residue trajectories are advantageous for optimum spread distribution. The processor 56 may also command the additional guide adjustor 148 to open variable clearance 145 (see FIG. 1E) so that material is dropped to the middle directly behind the combine 72 in conjunction with modifying position of the guides 116 or regulators 210, which may project residue further to the sides to optimize distribution of residue.

The processor 56 may thus command the spreader controller 161 to adjust the various spreader components to optimize the discharge flow of residue to form an approximately even distribution of residue in a row, or in rows, on the ground surface, while compensating for weather, as for example wind.

In other embodiments, a header detector 87, shown in a dotted box in FIG. 3 and shown as attached to combine 72 in FIG. 1, may automatically recognize the type and/or size of header 86 (see FIG. 1A) connected to a harvesting machine, such as combine 72. The size of the header 86 can provide for the cut width. In operation, it is desired to place residue on the ground surface to the full extent of the cut crop, but no any further in which it could overlap a previous pass, overlap onto un-cut crop, or overlap onto non-crop ground. Thus, it is desired to spread residue evenly across the ground surface at a width similar to the width size of the header 86.

The header detector 87 transmits the header size over a channel 34 to the processor 56. The processor 56 receives header size information from the header detector 87 to further analyze and/or calculate for any required correction at the spreader controller 161. Header detector 87 is operable for automatically identifying a header 86 connected to the machine and outputting a signal or information representative thereof to processor 56 across channel 34, to enable processor 56 to select and retrieve the appropriate spreader setting information for that header 87. In one example, header detector 87, can include, a plug or receptacle on combine 72 which is connectable by a mating plug or receptacle on a header 86 when the header 86 is connected to the combine 72, and operable for automatically identifying the header 86. For instance, header detector 87 can include a connector containing series of switches, the states of which are changed in different predetermined manners by connection of different mating connectors thereto, wherein each different width and/or type of header has a different mating connector which changes the state of the switches in the predetermined manner for that header 86. As another example, a header could include a memory device storing information identifying the header, and in which the information is provided to processor 56 upon connection of the header to the combine 72. Such a memory device can include a commercially available EPROM, flash memory or other suitable device. Header detector 87 can also include RFID or other circuitry for air-borne communication, which can be activated by proximity or connection of the header 86 to a combine 72, for inputting the identifying information to processor 56. Additionally, header detector 87 can be configured so as to encompass or contain all or some of the stored spreader setting information noted above as being contained in memory.

In other embodiments, the processor 56 may further analyze for different crops, different crop conditions, and for environmental conditions from input sensor providing information pertaining to crop and/or environmental conditions (not shown).

As noted above, the impeller control device 162, flow guide adjustors 146, and additional guide adjustor 148 are connected and operated by processor 56. In other embodiments, one or some of the impeller control device 162, flow guide adjustors 146, and additional guide adjustor 148 may be connected and operated by processor 56. Manual devices, such as switches or levers, may be connected to one or more of the impeller control devices 162, flow guide adjustors 146, and additional guide adjustor 148 so that an operator of the combine 72 may directly alter the rotation speed of the impellers 100, 102, guide 116 position, and/or regulator 210 position.

In other embodiments, the spreader setting unit 38 may be the spreader controller 161.

Now, additionally referring to FIGS. 4-8 there is illustrated another variation or embodiment of the present invention. Items having reference numbers between 400 and 599 are similar to items discussed above having numbers which are 400 smaller and which can be referred to by the name used with the above described item.

Figure 6A:
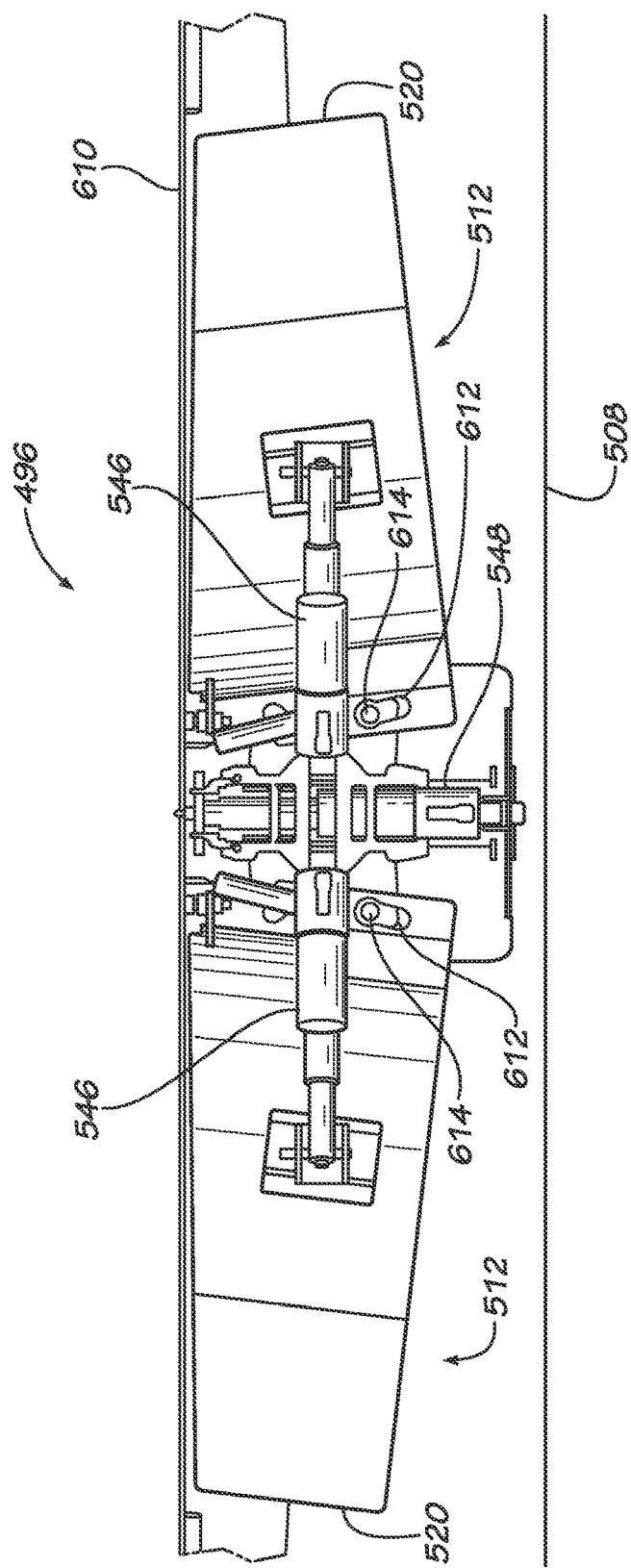
FIG. 6A is a view of a part of the spreader of FIGS. 4 and 5 illustrating a position of the flow diverters of the spreader.
Figure 6B:
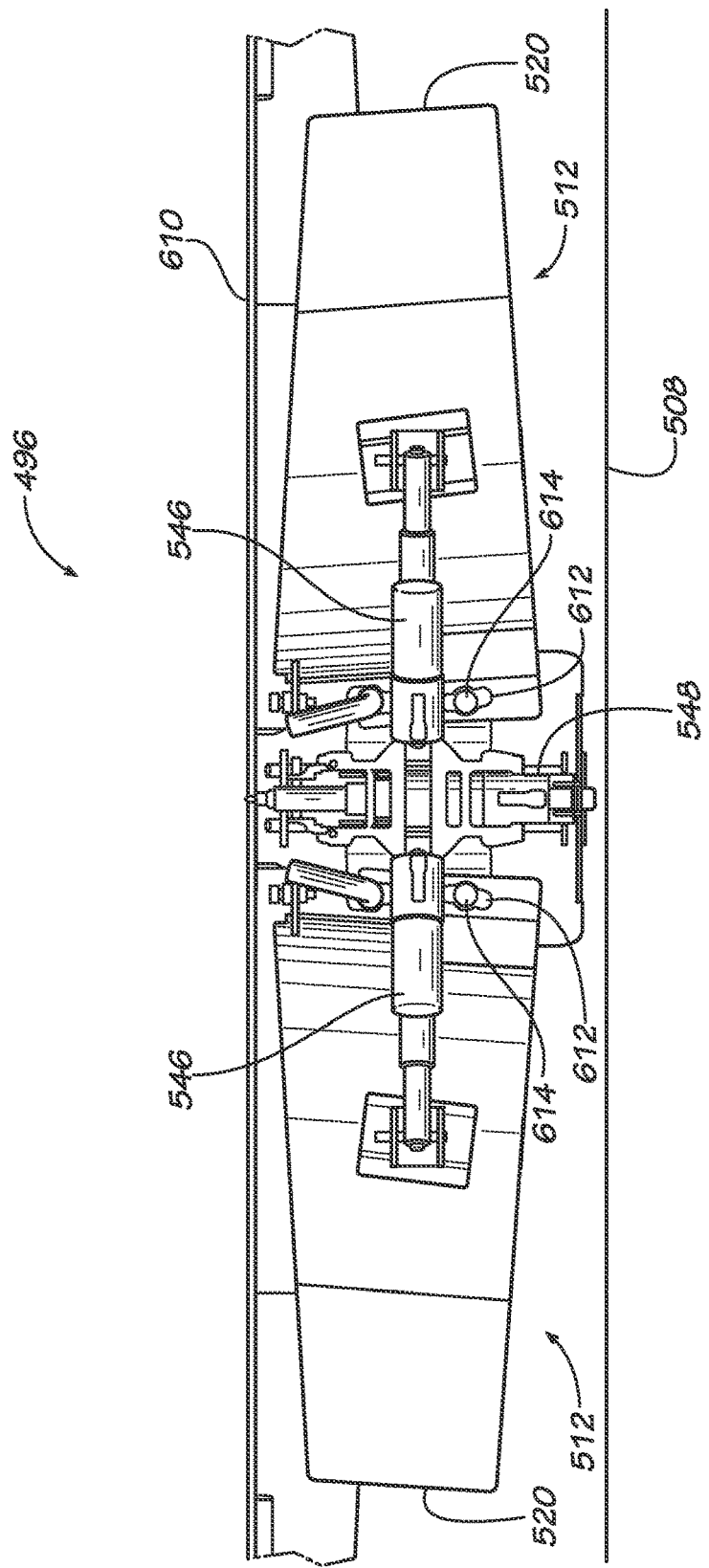
FIG. 6B is another of a part of the spreader of FIGS. 4 and 5 illustrating a position of the flow diverters of the spreader.
Figure 6C:
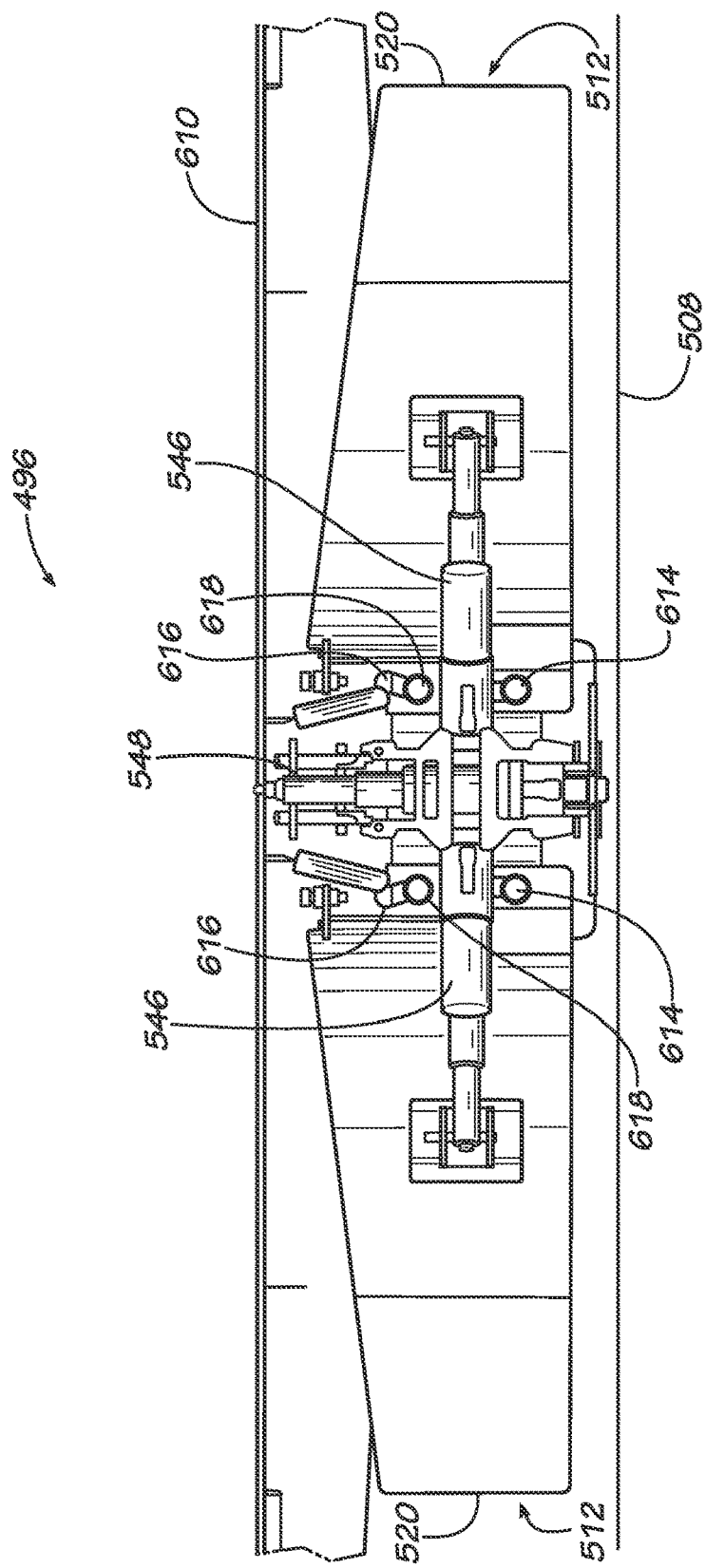
FIG. 6C is yet another of a part of the spreader of FIGS. 4 and 5 illustrating a position of the flow diverters of the spreader.

A spreader 496 has a divider 610 illustrated from differing perspectives. Adjustors 546 and 548, which may be actuators 546 and 548, are positioned to move flow distributors 512 to thereby alter the trajectory of the residue, or from another perspective the energy imparted to the residue as it flows through and from spreader 496. While, actuators 546 are configured to move flow distributors 512 in a direction that is generally perpendicular to rotational axes 104 and 106, actuator 548 moves in a direction that is generally, or even substantially, parallel with rotational axes 104 and 106. The movement of actuator 548 is effected to alter not only the position, but also the pivotal angle of flow distributors 512. This can be seen in the series of FIGS. 6A-6C, where it can be seen that the portion of flow distributors 512 that is closest to actuator 548 moves in the direction of rear wall 508, which can also be called back sheet 508, as flow distributors 512 pivot about the end of actuators 546 as actuator 548 moves. In FIG. 6C one edge of flow distributors 512 is substantially parallel with back sheet 508.

The pivoting movement of flow distributors 512 is caused by the interaction of angled slots 612 and 616 as they interact with guide pins 614 and 618, as well as the movement of actuator 548. As flow distributors 512 approach or depart from back sheet 508, by the action of actuator 548, flow distributors 512 pivot about an end of actuators 546. The rod ends of actuators 546 each have a clevis, or similar device, that allows flow distributors 512 to pivot thereabout. The pivoting movement of flow distributors 512 is controlled by the movement of actuator 548 and the geometry and location of slots 612 and 616, and pins 614 and 618. Flow distributors 512 may be biased by way of springs, or other mechanisms, to assist in the movement of slots 612 and 616 with pins 614 and 618. It is also contemplated that the movement of the two illustrated flow distributors 512 can also be effected independently if two separate actuators, similar to actuator 548, are used.

Figure 7:
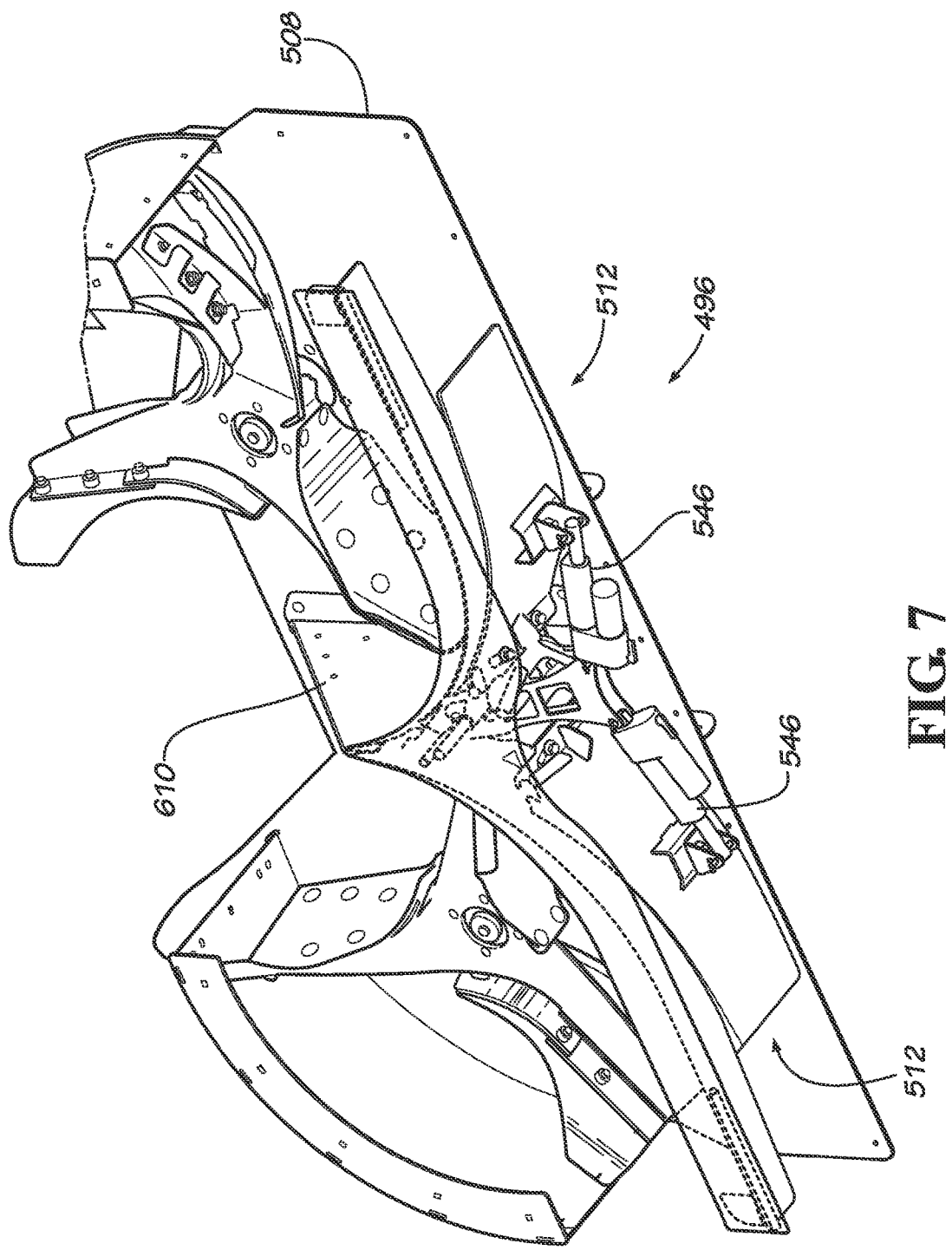
FIG. 7 is a perspective view of the spreader of FIGS. 4-6C illustrating a position of the flow diverters of the spreader.
Figure 8:
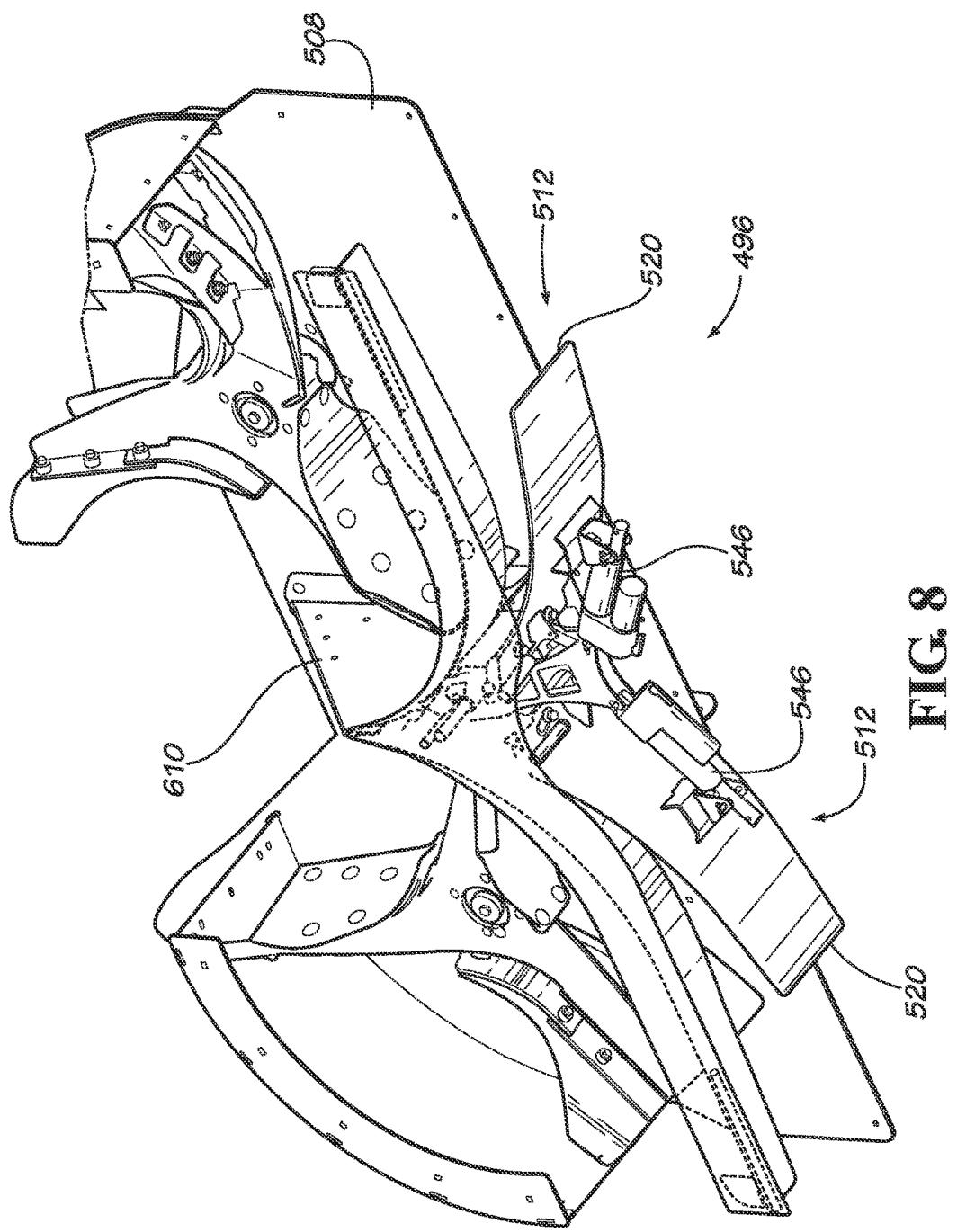
FIG. 8 is another perspective view of the spreader of FIGS. 4-7 illustrating another position of the flow diverters of the spreader.

A movement of flow distributors 512 by adjustors 546, in a direction generally perpendicular to axes 104 and 106, can be seen in FIGS. 7 and 8. The combination of the pivotal movement caused by actuator 548, with the movement effected by adjustors 546 allow greater control of the energy imparted to the residue traveling through spreader 496 as well as the trajectory of the residue after it leaves spreader 496.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for discharging residue from an agricultural combine to a ground surface, comprising:
   a spreader operatively connected to a rear end of the agricultural combine, the spreader including:
      an impeller having an axis of rotation;
      a housing, the impeller being operatively connected to the housing for rotating therein, the housing having:
         an inlet for receiving a flow of residue;
         an outlet configured about a lateral side of the housing for discharging the flow of residue;
      a plurality of residue flow distributors each pivotably movable in a direction generally parallel with the axis of rotation, each of the residue flow distributors being configured to guide the discharged flow of residue sidewardly away from the spreader to the ground surface, a rotation of the impeller discharges a flow of residue received through the inlet out through the outlet;
      a first actuator coupled to the residue flow distributors, the first actuator being configured to move the residue flow distributors in a direction generally parallel to the axis of rotation;
      a second actuator coupled to at least one of the residue flow distributors, the second actuator being configured to move the at least one of the flow distributors in a direction generally perpendicular to the axis of rotation, the second actuator being movable by the first actuator in the direction that is generally parallel to the axis of rotation; and
      a plurality of pins coupled to the first actuator, the residue flow distributors each having two slots in a first portion of the residue flow distributors, each slot being associated with a corresponding one of the plurality of pins, the pins and the corresponding slots coact to cause each of the residue flow distributors to pivot as the first actuator moves in a linear direction.

2. The system of claim 1, wherein the first actuator has a first movement direction, the second actuator has a second movement direction, the first movement direction and the second movement direction being substantially perpendicular to each other.

3. The system of claim 2, further comprising a third actuator, the plurality of residue flow distributors including a first residue flow distributor and a second residue flow distributor, the second actuator being coupled to the first residue flow distributor, the third actuator being coupled to the second residue flow distributor, the third actuator being configured to move the second flow distributor in a direction generally perpendicular to the axis of rotation, wherein the first residue flow distributor and the second residue flow distributors are both configured to slidingly pivot when the first actuator moves in the direction generally parallel with the axis of rotation.

4. The system of claim 1, further comprising a clevis coupling an end of the second actuator with the at least one of the residue flow distributors.

5. The system of claim 4, wherein the clevis allowing the at least one of the residue flow distributors to pivot relative to the second actuator as the first actuator moves in a linear direction.

6. The system of claim 1, further comprising:
   a spreader controller configured to adjust the spreader to optimize the discharge of the flow of residue to form an approximately even distribution of residue on the ground surface while compensating for one or more wind characteristics; and
   a data storage device in communication with the spreader controller, the spreader controller being configured to process spreader information and to issue a spreader adjustment command.

7. The system of claim 6, wherein the spreader further comprises one or more flow regulators each being pivotably connected to a lateral side of the spreader about a substantially vertical axis to pivot the one or more flow regulators in a fore and an aft direction to the motion of travel of the combine and wherein each of the flow regulators comprise:
   a fore portion;
   an aft portion; and
   an upper portion connecting the fore and aft portions.

8. The system of claim 7, wherein the spreader controller comprises one or more regulator adjustors for adjusting the one or more flow regulators from a pointing position away from the side of the combine in which the one or more flow regulators extend perpendicular to a side of the combine to a rear pointing position away from the rear of the combine in which the one or more flow regulators extend in the opposing motion of travel direction of the combine, wherein in the pointing position facing away from the side of the combine the flow of residue distributes sideward from the combine and in the rear pointing position the flow of residue distributes to approximately behind the combine, wherein the one or more regulator adjustors are selected from one of an electric actuator, pneumatic actuator, and hydraulic actuator, and wherein the spreader information further comprises a current flow regulator position and wherein the spreader adjustment command comprises an adjusting a flow regulator position from the current flow regulator position.

9. The system of claim 6, wherein the spreader controller comprises an impeller controller device connected to an impeller motor connected to the impeller, wherein the spreader controller adjusts the impeller motor to drive a rotation speed of the impeller, and wherein the spreader information comprises a current impeller rotation speed and wherein the spreader adjustment command comprises an adjusted impeller rotation speed from the current impeller rotation speed.

10. The system of claim 6, further comprising a combine settings unit comprising at least one of a combine location sensing device and a combine speed sensor device, wherein the combine location sensing device is located on or about the combine to transmit sensed combine location to the controller over the channel and wherein the combine speed sensor device is located on or about the combine to transmit sensed combine speed to the controller over the channel, and wherein the controller analyzes combine speed and combine location for retrieving compensation spreader setting entries.

11. The system of claim 10, wherein the data storage device further stores combine information entries in a look-up table comprising at least one of combine location entries and combine speed entries in a combine information listing, wherein each of the combine information entries are adjoined to one wind information entry and one compensation spreader setting entry and wherein the sensed combine speed and sensed combine location received by the controller is matched by the controller to an approximately equal combine information entry in the look-up table and wherein the controller retrieves the compensation spreader setting entry adjoined to the combine information entry and wind information entry.

12. A spreader configured for discharging residue, the spreader being configured to be connectable to a rear end of an agricultural combine, the spreader comprising:
an impeller having an axis of rotation;
a housing, the impeller being operatively connected to the housing for rotating therein, the housing having:
an inlet for receiving a flow of residue;
an outlet configured about a lateral side of the housing for discharging the flow of residue;
a plurality of residue flow distributors each pivotably movable in a direction generally parallel with the axis of rotation, each of the residue flow distributors being configured to guide the discharged flow of residue sidewardly away from the spreader to the ground surface, a rotation of the impeller discharges a flow of residue received through the inlet out through the outlet;
a first actuator coupled to the residue flow distributor, the first actuator being configured to move the residue flow distributors in a direction generally parallel to the axis of rotation;
a second actuator coupled to at least one of the residue flow distributors, the second actuator being configured to move the at least one of the flow distributors in a direction generally perpendicular to the axis of rotation, the second actuator being movable by the first actuator in the direction that is generally parallel to the axis of rotation; and
a plurality of pins coupled to the first actuator, the residue flow distributors each having two slots in a first portion of the residue flow distributors, each slot being associated with a corresponding one of the plurality of pins, the pins and the corresponding slots coact to cause each of the residue flow distributors to pivot as the first actuator moves in a linear direction.

13. The spreader of claim 12, wherein the first actuator has a first movement direction, the second actuator has a second movement direction, the first movement direction and the second movement direction being substantially perpendicular to each other.

14. The spreader of claim 13, further comprising a third actuator, the plurality of residue flow distributors including a first residue flow distributor and a second residue flow distributor, the second actuator being coupled to the first residue flow distributor, the third actuator being coupled to the second residue flow distributor, the third actuator being configured to move the second flow distributor in a direction generally perpendicular to the axis of rotation, wherein the first residue flow distributor and the second residue flow distributors are both configured to slidingly pivot when the first actuator moves in the direction generally parallel with the axis of rotation.

15. The spreader of claim 12, further comprising a clevis coupling an end of the second actuator with the at least one of the residue flow distributors.

16. The spreader of claim 15, wherein the clevis allows the at least one of the residue flow distributors to pivot relative to the second actuator as the first actuator moves in a linear direction.

17. The spreader of claim 12, further comprising a spreader controller configured to adjust the spreader to optimize the discharge of the flow of residue to form an approximately even distribution of residue on the ground surface while compensating for one or more wind characteristics, the spreader controller being configured to process spreader information and to issue a spreader adjustment command.

18. The spreader of claim 17, further comprising one or more flow regulators each being pivotably connected to a lateral side of the spreader about a substantially vertical axis to pivot the one or more flow regulators in a fore and an aft direction to the motion of travel of the combine and wherein each of the flow regulators comprise:
a fore portion;
an aft portion; and
an upper portion connecting the fore and aft portions.

19. The spreader of claim 18, wherein the spreader controller comprises one or more regulator adjustors for adjusting the one or more flow regulators from a pointing position away from the side of the combine in which the one or more flow regulators extend perpendicular to a side of the combine to a rear pointing position away from the rear of the combine in which the one or more flow regulators extend in the opposing motion of travel direction of the combine, wherein in the pointing position facing away from the side of the combine the flow of residue distributes sideward from the combine and in the rear pointing position the flow of residue distributes to approximately behind the combine, wherein the one or more regulator adjustors are selected from one of an electric actuator, pneumatic actuator, and hydraulic actuator, and wherein the spreader information further comprises a current flow regulator position and wherein the spreader adjustment command comprises an adjusting a flow regulator position from the current flow regulator position.

20. The spreader of claim 17, wherein the spreader controller comprises an impeller controller device connected to an impeller motor connected to the impeller, wherein the spreader controller adjusts the impeller motor to drive a rotation speed of the impeller, and wherein the spreader information comprises a current impeller rotation speed and wherein the spreader adjustment command comprises an adjusted impeller rotation speed from the current impeller rotation speed.

* * * * *